(12) United States Patent
Deboy

(10) Patent No.: US 10,374,447 B2
(45) Date of Patent: Aug. 6, 2019

(54) POWER CONVERTER CIRCUIT INCLUDING AT LEAST ONE BATTERY

(71) Applicant: Infineon Technologies Austria AG, Villach (AT)

(72) Inventor: Gerald Deboy, Klagenfurt (AT)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 432 days.

(21) Appl. No.: 13/830,528

(22) Filed: Mar. 14, 2013

(65) Prior Publication Data

US 2014/0266069 A1 Sep. 18, 2014

(51) Int. Cl.
*B60L 11/18* (2006.01)
*H02J 7/00* (2006.01)
*H02J 7/02* (2016.01)
*H02M 3/158* (2006.01)

(52) U.S. Cl.
CPC .......... *H02J 7/0052* (2013.01); *H02J 7/0077* (2013.01); *H02J 7/022* (2013.01); *H02J 7/007* (2013.01); *H02J 2007/0037* (2013.01); *H02M 3/1582* (2013.01)

(58) Field of Classification Search
CPC .......... H02J 3/385; H02J 7/022; H02J 7/0077
USPC ........................................................ 320/149
See application file for complete search history.

(56) References Cited

U.S. PATENT DOCUMENTS

| | | | |
|---|---|---|---|
| 5,225,712 A * | 7/1993 | Erdman | F03D 7/0272 290/44 |
| 6,025,694 A * | 2/2000 | Mercke | H02J 7/0004 320/106 |
| 6,081,104 A * | 6/2000 | Kern | 323/268 |
| 6,362,540 B1 * | 3/2002 | Hill | H02J 1/10 307/24 |
| 6,674,263 B2 * | 1/2004 | Agbossou | H01M 8/04992 307/151 |
| 6,917,124 B2 * | 7/2005 | Shetler, Jr. | H02J 9/061 307/66 |
| 9,013,139 B2 * | 4/2015 | Pinnell | H02J 7/045 320/106 |
| 9,673,732 B2 * | 6/2017 | Deboy | H02M 7/49 |
| 9,787,170 B2 * | 10/2017 | Inoue | G05F 1/67 |
| 2007/0222411 A1 * | 9/2007 | Cour | 320/101 |
| 2009/0262523 A1 * | 10/2009 | Chen | H05B 33/0809 362/183 |
| 2011/0115295 A1 * | 5/2011 | Moon | H02J 3/32 307/65 |

(Continued)

OTHER PUBLICATIONS

"Li-Ion Battery Charger Solution Using the MSP430," Texas Instruments, Application Report: SLAA287—Dec. 2005, 8 pages.

(Continued)

*Primary Examiner* — Drew A Dunn
*Assistant Examiner* — Tarikh Kanem Rankine
(74) *Attorney, Agent, or Firm* — Slater Matsil, LLP

(57) ABSTRACT

A circuit includes a first power converter circuit and a second power converter circuit. The input of the second power converter circuit is coupled to the output of the first power converter circuit and is configured to receive an input signal. A rechargeable battery is coupled to the output of the first power converter circuit. A charge control circuit is configured to control charging the rechargeable battery by controlling the second power converter circuit.

27 Claims, 13 Drawing Sheets

(56) References Cited

U.S. PATENT DOCUMENTS

| | | | | |
|---|---|---|---|---|
| 2011/0140649 A1* | 6/2011 | Choi | ............... | H01M 14/005 |
| | | | | 320/101 |
| 2011/0144822 A1* | 6/2011 | Choi | ............... | H02J 3/32 |
| | | | | 700/297 |
| 2011/0148353 A1* | 6/2011 | King | ............... | B60L 7/12 |
| | | | | 320/109 |
| 2011/0215778 A1* | 9/2011 | Chen | ............... | 323/267 |
| 2011/0291606 A1* | 12/2011 | Lee | ............... | 320/101 |
| 2012/0047386 A1* | 2/2012 | Matsui | ............... | H01M 10/465 |
| | | | | 713/340 |
| 2012/0300515 A1* | 11/2012 | Carletti | ............... | H02M 1/4225 |
| | | | | 363/74 |
| 2013/0009700 A1 | 1/2013 | Deboy et al. | | |
| 2013/0026974 A1* | 1/2013 | Huang | ............... | 320/107 |
| 2013/0181519 A1* | 7/2013 | Lee | ............... | H02J 3/28 |
| | | | | 307/24 |
| 2013/0181529 A1 | 7/2013 | Tang et al. | | |
| 2013/0181530 A1 | 7/2013 | Deboy et al. | | |
| 2013/0187473 A1 | 7/2013 | Deboy et al. | | |
| 2014/0002003 A1* | 1/2014 | Kim | ............... | 320/103 |
| 2014/0153294 A1 | 6/2014 | Deboy et al. | | |
| 2014/0175888 A1 | 6/2014 | Deboy | | |
| 2014/0191582 A1 | 7/2014 | Deboy et al. | | |

OTHER PUBLICATIONS

Everts, J., et al., "Comparative Evaluation of Soft-Switching, Bidirectional, Isolated AC/DC Converter Topologies," Applied Power Electronics Conference and Exposition (APEC), 2012 Twenty-Seventh Annual IEEE, Feb. 5-9, 2012, pp. 1067-1074.

\* cited by examiner

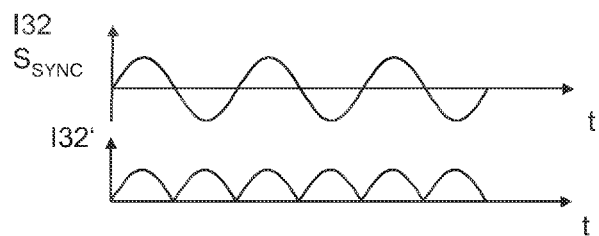
FIG 12
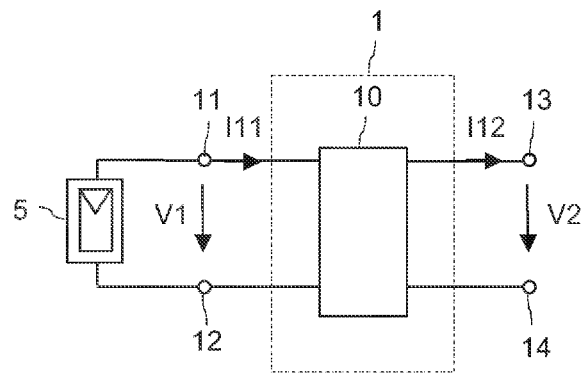
FIG 13
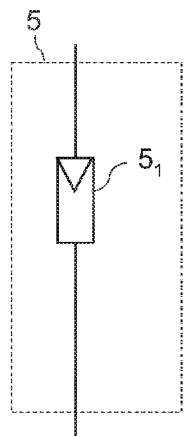  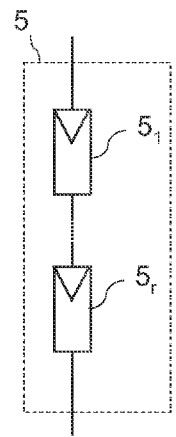  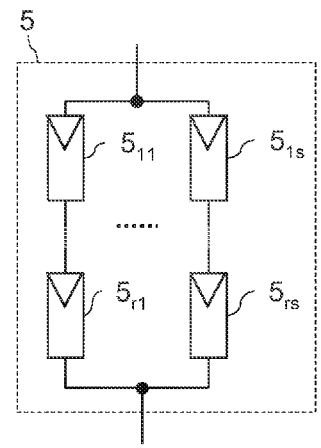
FIG 14A   FIG 14B   FIG 14C

US 10,374,447 B2

POWER CONVERTER CIRCUIT INCLUDING AT LEAST ONE BATTERY

TECHNICAL FIELD

Embodiments of the present invention relate to a power converter circuit, in particular a power converter circuit that includes at least one battery.

BACKGROUND

With an increasing interest in sustainable energy production there is one focus on using photovoltaic (PV) modules for producing electric power. PV modules output maximum power during periods when the sun is shining. However, the power consumption, for example, by industry or for domestic use, often does not correspond to those periods when the sun is shining. In the case of domestic use, power consumption may be even higher when the sun is not shining, for example, in the evening or at night.

It is therefore desirable to store electrical power when there is an excess of electrical power, such as when the sun is shining, and to supply the stored power to the power grid when there is a high power consumption, such as in the evening or at night.

SUMMARY OF THE INVENTION

According to one example, a circuit is described herein. The electronic circuit includes a first power converter circuit including an output, a second power converter circuit including an input, and an output. The input is coupled to the output of the first power converter circuit and is configured to receive an input signal. A rechargeable battery is coupled to the output of the first power converter circuit. The electronic circuit further includes a charge control circuit configured to control the second power converter circuit.

According to another example, a method is described herein. The method includes supplying output power at an output of a first power converter circuit, and controlling a charging of a rechargeable battery coupled to the output of the first power converter circuit by controlling a second power converter circuit coupled to the output of the first power converter circuit.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like features.

FIG. 2, which includes

FIG. 12 schematically illustrates a waveform of a synchronization signal received by the PWM controller of FIG. 11, and of an output current of a converter stage;

FIG. 13 shows one embodiment of the first power converter circuit including a power converter unit;

FIG. 14, which includes FIGS. 14A to 14C, shows embodiments of a PV module;

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
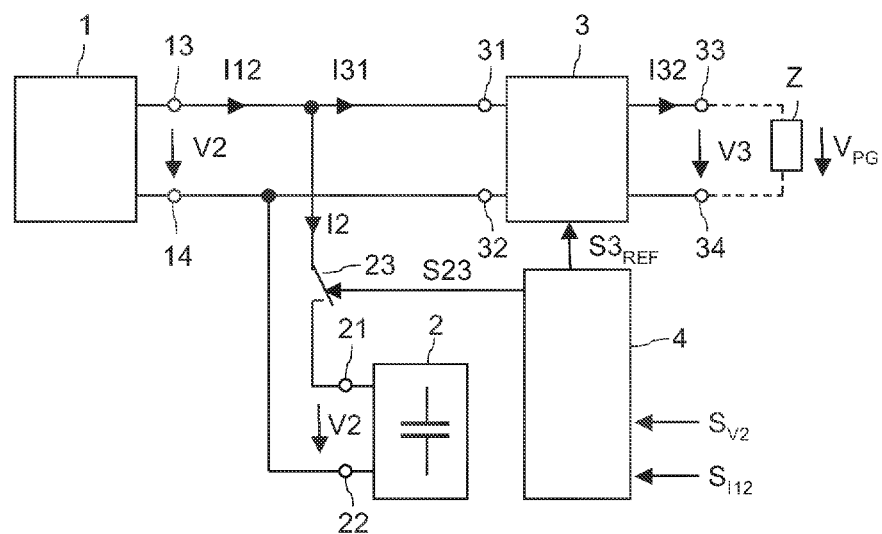
FIG. 1 illustrates a first embodiment of an electronic circuit including a first power converter circuit, a second power converter circuit, a battery and a charge control circuit.

FIG. 1 illustrates one embodiment of an electronic circuit that includes a first power converter circuit 1, a second power converter circuit 3, a rechargeable battery 2, and a charge control circuit 4. The first power converter circuit 1 includes an output with a first output node 13, and a second output node 14 and is configured to supply an output power signal. The second power converter circuit 3 includes an input with first and second input nodes 31, 32 coupled to the output of the first power converter circuit 1, and configured to receive an input power signal. The second power converter circuit 3 is further configured to supply an output power signal to a load Z (illustrated in dashed lines in FIG. 1). The rechargeable battery 2 is coupled to the output 13, 14 of the first power converter circuit 1 and the input 31, 32 of the second power converter circuit 3. The charge control circuit 4 is configured to detect a charge state of the rechargeable battery 2 and to control the second power converter circuit 3 dependent on the charge state of the rechargeable battery.

Referring to FIG. 1, the second power converter circuit 3 receives two input signals, namely an input current I31 and an input voltage V2, wherein the input voltage V2 corresponds to an output voltage of the first power converter circuit 1, and to a voltage between terminals 21, 22 of the rechargeable battery 2. The input current I31 of the second power converter circuit 3 corresponds to an output current of the first power converter circuit 1 minus an input current I2 of the rechargeable battery 2:

$$I31=I12-I2 \qquad (1).$$

According to the electronic circuit of FIG. 1, in some embodiments, charging and discharging of the rechargeable battery 2 is only controlled by controlling the second power converter circuit 3, in particular by controlling one of the input current I31, and the input voltage V2 of the second power converter circuit 3. This is explained in further detail herein below.

Figure 2A:
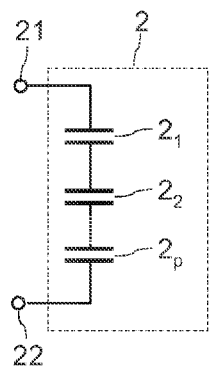
FIGS. 2A and 2B, shows embodiments of a representation of a battery that may be charged according to the techniques described herein.
Figure 2B:
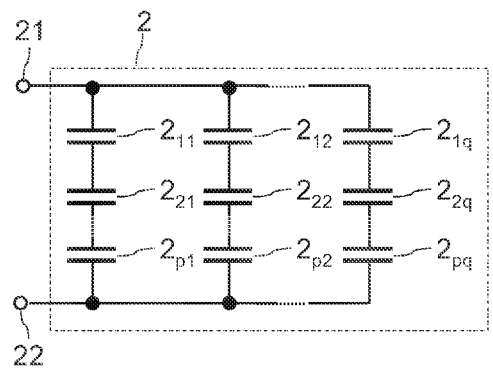

The rechargeable battery 2 can be a conventional rechargeable battery such as, for example, a lead-acid battery, a Nickel-Cadmium (NiCd) battery, a Nickel-Metal-Hydride (NiMH) battery, or a Lithium-Ion battery. Referring to FIG. 2A, the rechargeable battery 2 may include one cell string with a plurality of battery cells $2_1$-$2_p$ connected in series between the battery terminals 21, 22. According to a further embodiment, illustrated in FIG. 2B, the rechargeable battery 2 may include a plurality of cell strings connected in parallel to the battery terminals 21, 22, wherein each cell string includes a plurality of battery cells $2_{11}$-$2_{p1}$, $2_{12}$-$2_{p2}$, $2_{1q}$-$2_{pq}$ connected in series. A maximum voltage that can be supplied by the rechargeable battery 2 between the battery terminals 21, 22 is dependent on the number of battery cells connected in series in one string. The capacitance of the rechargeable battery 2 is dependent on the capacitance of the individual battery cells and/or the number of cells strings connected in parallel.

According to one embodiment, the electronic circuit of FIG. 1 supports at least one of a first charging mode in which the rechargeable battery 2 is charged with a constant charging current I2, and a second charging mode in which the rechargeable battery 2 is charged by applying a substantially constant voltage V2 between the battery terminals 21, 22. The first charging mode will also be referred to as constant current mode, and the second charging mode will be referred to as constant voltage mode in the following.

In the constant current mode, the input current I2 of the rechargeable battery 2 is controlled to be substantially constant by controlling the input current I31 of the second power converter circuit 3. When, for example, the battery input current I2 is higher than a predefined constant charging current I$2_{REF}$, the second power converter circuit 3, controlled by the charge control circuit 4, increases the input current I31, and when the battery charging current I2 is lower than the predefined constant charging current I$2_{REF}$, the second power converter circuit 3, controlled by the charge control circuit 4, decreases the input current I31. In the constant voltage mode, the second power converter circuit 3 controls the battery voltage V2, which is the voltage between its input nodes 31, 32, to correspond to a predefined charging voltage V$2_{REF}$.

Referring to FIG. 1, the charge control circuit 4 supplies an input reference signal S$3_{REF}$ to the second power converter circuit 3. The input reference signal S$3_{REF}$ represents the desired signal level of either the input current I31 in the constant current mode, or the battery voltage V2 in the constant voltage mode. In the constant current mode, the charge control circuit 4 measures the output current I12 of the first power converter 1 and calculates the input reference signal S$3_{REF}$ as follows:

$$S3_{REF}=I31_{REF}=I12-I2_{REF} \qquad (2),$$

where I$31_{REF}$ is the input reference signal representing the desired signal level of the input current I31, I12 is the measured output current of the first power converter circuit 1, and I$2_{REF}$ is the desired signal level of the battery current I2 in the constant current mode. The output current I12 of the first power converter circuit 1 can be measured in a conventional way that is not illustrated in FIG. 1. In FIG. 1, a signal $S_{I12}$ received by the charge control circuit 4 represents the measured output current I12 of the first power converter circuit 1.

In the constant voltage mode, the input reference signal S$3_{REF}$ provided by the charge control circuit 4 represents the input voltage reference signal V$2_{REF}$ that defines a desired signal level of the input voltage V2.

According to one embodiment, the charge control circuit 4 is configured to support only one of the two different charging modes. In this case, the charge control circuit 4 is either configured to supply the input current reference signal I$31_{REF}$ to the second power converter circuit 3, or to supply the input voltage reference signal V$2_{REF}$ as the input reference signal S$3_{REF}$ to the second power converter circuit 3.

According to a further embodiment, the charge control circuit 4 is configured to detect a charge state (state of charge, SOC) of the rechargeable battery 2 and is configured to control the second power converter circuit 3 dependent on the detected charge state. This is explained with reference to FIG. 3 below.

Figure 3:
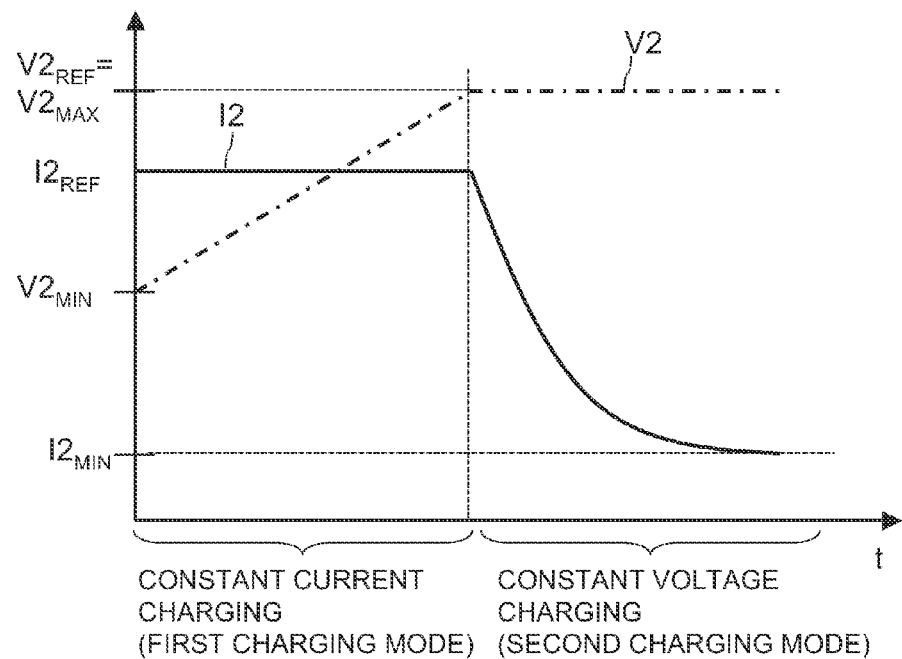
FIG. 3 shows one example of a charge curve of the battery.

FIG. 3 schematically illustrates the battery current I2 and the battery voltage V2 as controlled by the charge control circuit 4. In this embodiment, the charge state of the rechargeable battery 2 is represented by the battery voltage V2. That is, the charge control circuit 4 measures the battery voltage V2 and, dependent on the measured battery voltage V2, operates the second power converter circuit 2 such that the battery 2 is charged in the constant current mode or in the constant voltage mode. Referring to the curves illustrated in FIG. 3, the charge control circuit 4 operates the second power converter circuit 3 in the constant current mode when the battery voltage V2 is below a maximum battery voltage V$2_{MAX}$. FIG. 3 shows the battery voltage V2 and the battery current I2 over the time, wherein the charging process illustrated in FIG. 3 starts when the battery voltage V2 has decreased to a minimum voltage V$2_{MIN}$. As the battery is charged with the constant charging current I$2_{REF}$ in the constant current mode the battery voltage V2 usually increases. However, the linear increase illustrated in FIG. 3 is only one example. Referring to FIG. 3, the charge control circuit 4 changes to the constant voltage mode when the battery voltage V2 reaches the maximum voltage V$2_{MAX}$ that corresponds to the reference V$2_{REF}$ of the constant voltage mode. Consequently, the battery current I2 decreases. When the charging current decreases to a minimum charging current I$2_{MIN}$, the battery has been fully charged.

According to one embodiment, the electronic circuit stays in the constant voltage mode after the battery has been fully charged. That is, the second power converter circuit 3 controlled by the charge control circuit keeps the input voltage V2 on a substantially constant level represented by V$2_{REF}$.

According to a further embodiment, an optional switch 23 is connected between the battery 2 and the output of the first power converter circuit 1, and the input 31, 32 of the second power converter circuit 3, respectively. This switch 23 is controlled by the charge control circuit 4, wherein the charge control circuit 4 is configured to turn off the switch 23 in order to disconnect the battery 2 from the first and second power converter circuits 1, 3 when the battery 2 has been fully charged, that is when the current level of the charging current falls to the minimum level (the current threshold) $I2_{MIN}$. After the battery has been disconnected from the first and second power converter circuit 1, 3, the charge control circuit 4 may control the second power converter circuit 3 such that the input voltage V2 is controlled to be substantially constant. The input voltage reference signal $V2_{REF}$ may correspond to the input voltage reference signal $V2_{REF}$ used in the constant voltage mode. However, after the switch 23 has been opened, it is also possible to adjust the input voltage V2 to a voltage level other than the voltage level in the constant voltage mode.

After the battery 2 has been fully charged it may stay in the fully-charged state until a power consumption of the second power converter circuit 3 is higher than the output power of the first power converter circuit 1. In this case, the electronic circuit enters a discharging mode in which the battery 2 is discharged in favor of the second power converter circuit 3. In the discharging mode, the input voltage of the second power converter circuit 3 is defined by the battery voltage V2, which decreases as the battery 2 is discharged.

According to one embodiment, the charge control circuit 4 does not control the second power converter circuit 3 in the discharging mode. According to a further embodiment, the charge control circuit 4 measures the battery current I2 in the discharging mode (in the discharging mode, the battery current I2 flows in a direction opposite the direction illustrated in FIG. 2) and controls the input current I31 of the second power converter circuit 3 such that the magnitude of the battery current I2 is limited to a predefined maximum current.

According to one embodiment, the battery 2 is not discharged to below the minimum voltage level $V2_{MIN}$, and the minimum voltage level $V2_{MIN}$ is between 60% and 80% of the maximum voltage level $V2_{MAX}$. After the battery has been discharged, the electronic circuit may again charge the battery 2 as previously described, or the battery 2 may stay in the discharged state for a while. In the latter case, the charge control circuit 4 controls the second power converter circuit 3 such that the second power converter circuit 3 keeps the input voltage (the battery voltage) V2 on the minimum voltage level $V2_{MIN}$.

According to one embodiment, the second power converter circuit 3 is configured to supply the output current I32 to a power grid. In this case, the load Z of FIG. 1 is a power grid supplying a supply voltage $V_{PG}$. The power grid can be DC power grid or an AC power grid. In the first case, the supply voltage $V_{PG}$ is a direct voltage (DC voltage), and in the second case, the supply voltage $V_{PG}$ is an alternating voltage (AC voltage). The power grid voltage $V_{PG}$ defines the output voltage V3 of the second power converter circuit, that is $V3=V_{PG}$. In this embodiment, the output current I32 of the second power converter circuit 3 is variable and is dependent on the input power received at the input of the second power converter circuit. According to one embodiment, the second power converter circuit 3 is implemented as a switched-mode converter.

Figure 4:
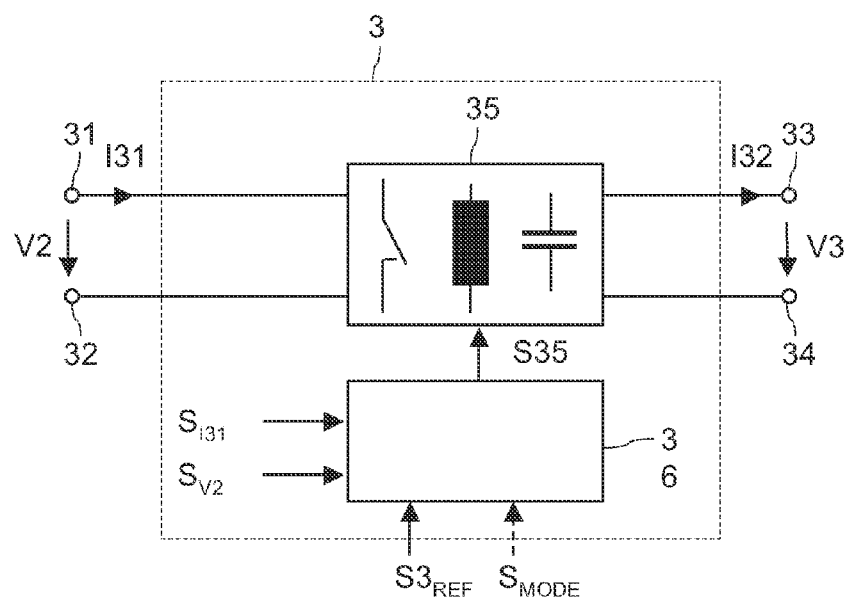
FIG. 4 shows one embodiment of a second power converter circuit.

FIG. 4 schematically illustrates one embodiment of a second power converter circuit 3 configured to supply the output current I32 to a power grid. Referring to FIG. 4, the second power converter circuit 3 includes a switched-mode converter stage 35 that is configured to receive the input current I31 and the input voltage V2 and to supply the output current I32. The converter stage 35 includes at least one switch that is switched on and off in pulse-width modulated (PWM) fashion, at least one inductor, and at least one capacitive storage element (capacitor). The second power converter circuit 3 further includes a PWM controller 36 that is configured to receive the input reference signal $S3_{REF}$ and at least one of an input current signal $S_{I31}$ and an input voltage $S_{V2}$. The input current signal $S_{I31}$ represents the input current I31 of the second power converter circuit 3 and can be obtained in a conventional way by measuring the input current I31. The input voltage signal $S_{V2}$ represents the input voltage V2 of the second power converter circuit 3 and can be obtained in a conventional way by measuring the input voltage V2. Measurement circuits for measuring at least one of the input current I31 and the input voltage V2 and for providing the corresponding measurement signal $S_{I31}$, $S_{V2}$ are not illustrated in FIG. 4. The PWM controller is configured to output at least one PWM signal for controlling the PWM operation of the at least one switch in the converter stage 35.

Figure 5:
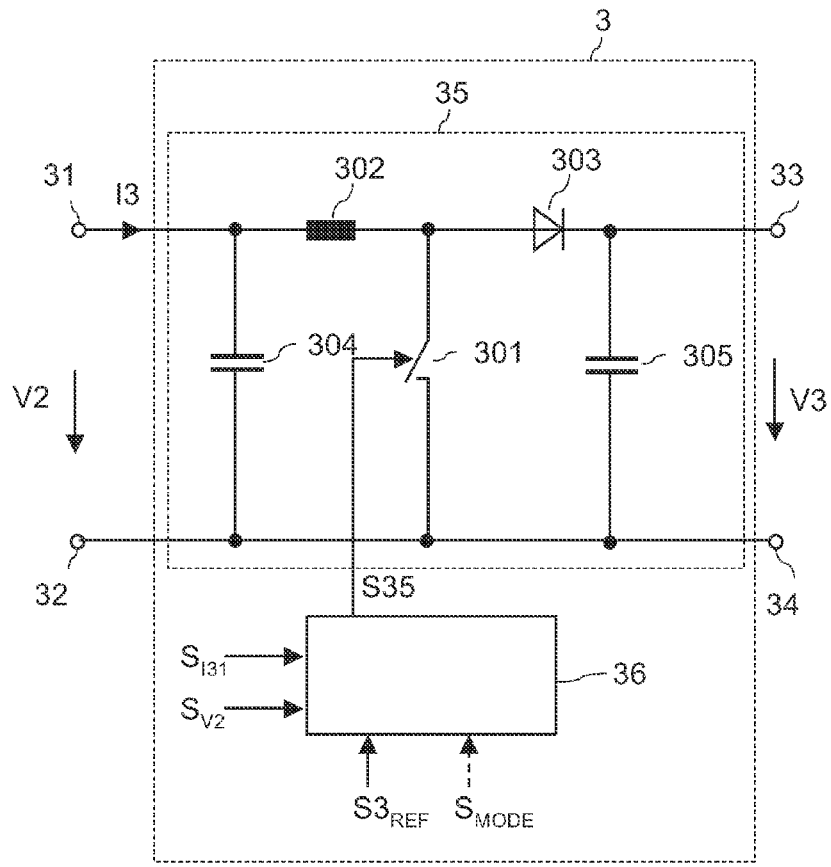
FIG. 5 shows a one embodiment of a power converter stage of the second power converter circuit of FIG. 4.

FIG. 5 illustrates one embodiment of a converter stage 35 that is configured to supply the output current I32 to a DC voltage grid. The converter stage 35 of FIG. 5 is implemented with a boost converter topology and includes a series circuit with an inductive storage element 302, such as a choke, and a switch 301 between the input terminals 31, 32. Further, a rectifier element 303, such as a diode, is connected between a circuit node common to the inductive storage element 302 and the switch 301 and the first output node 33. The second output node 34 is connected to the second input node. A first capacitive storage element 304, such as a capacitor, is connected between the input nodes 31, 32. Optionally, a second capacitive storage element 305, such as a capacitor, is connected between the output nodes 33, 34.

The switch 301 can be implemented as a conventional electronic switch, such as a MOSFET (Metal-Oxide-Semiconductor Field-Effect Transistor) or an IGBT (Insulated Gate Bipolar Transistor). The rectifying element 303 could be implemented as a synchronous rectifier, which is a rectifier implemented using an electronic switch, such as a MOSFET or an IGBT. According to a further embodiment, the switch 301 is implemented as GaN-HEMT (Gallium Nitride High-Electron-Mobility Transistor).

Referring to FIG. 5, the switch 301 receives the PWM signal S35 from the PWM controller 36 as a drive signal, wherein the PWM controller 36 is configured to adjust a duty cycle of the PWM drive signal S35 such that the input signal (the input current I31 or the input voltage V2) to be controlled corresponds to the reference signal $S3_{REF}$.

Figure 6:
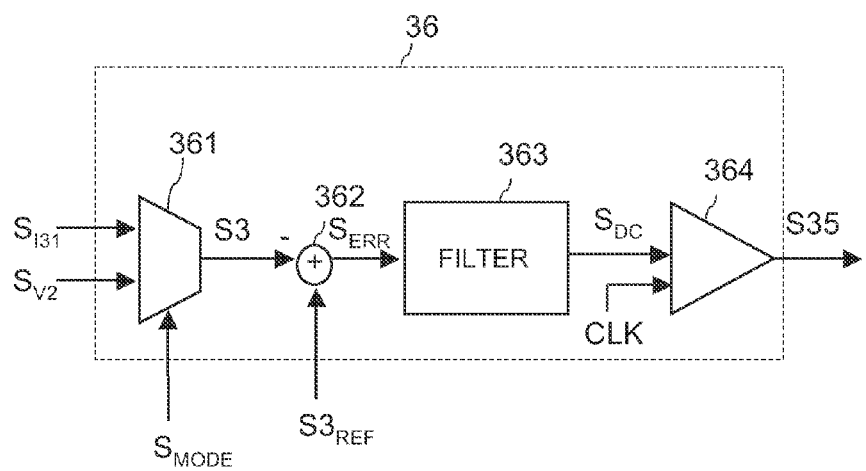
FIG. 6 shows one embodiment of a PWM controller of the second power converter circuit of FIG. 4.

FIG. 6 schematically illustrates one embodiment of the PWM controller 36. In FIG. 6, functional blocks of the PWM controller 36 are illustrated. These functional blocks can be implemented as analog circuits, as digital circuits or can be implemented using hardware and software.

Referring to FIG. 6, the PWM controller 36 calculates an error signal $S_{ERR}$ from an input signal S3 and the reference signal $S3_{REF}$ received from the charge control circuit 4. The input signal S3 represents the input signal to be controlled, that is, the input signal S3 either represents the input voltage V2 or the input current I31. In the embodiment of FIG. 6, the PWM controller is configured to control the input current I31 or the input voltage V2 dependent on an operation mode signal $S_{MODE}$ received from the charge mode controller. The operation mode signal indicates whether the input current I31 or the input voltage V2 is to be controlled, and the input reference signal $S3_{REF}$ indicates the desired signal level of the controlled input signal S3. In the embodiment of FIG. 6, a multiplexer receives the input current signal $S_{I31}$ and the input voltage signal $S_{V2}$ and, controlled by the operation mode signal $S_{MODE}$, outputs one of these signal as the input signal S3 to a subtraction element 362 that calculates the error signal $S_{ERR}$.

In an embodiment of the electronic circuit in which the second power converter circuit 3 is only operated in the constant current mode or the constant voltage mode, the PWM controller 36 only receives one of the input current signal $S_{I31}$ and the input voltage signal $S_{V2}$. In this case, the multiplexer 361 and the operation mode signal $S_{MODE}$ can be omitted.

Referring to FIG. 6, the error signal $S_{ERR}$ is received by a filter 363 that generates a duty cycle signal $S_{DC}$ from the error signal $S_{ERR}$. The duty cycle signal $S_{DC}$ represents the duty cycle of the drive signal S35 provided by the PWM controller 36. The filter 363 can be a conventional filter for generating a duty cycle signal $S_{DC}$ from an error signal $S_{ERR}$ in a PWM controller of a power converter stage, such as a P-filter, a PI-filter, or a PID-filter. A PWM driver 364 receives the duty cycle signal $S_{DC}$ and a clock signal CLK and generates the drive signal S35. The drive signal S35 has a switching frequency as defined by the clock signal CLK and a duty cycle as defined by the duty cycle signal $S_{DC}$. This driver 364 can be a conventional PWM driver as is well known in the art that is configured to generate a PWM drive signal based on a clock signal and a duty cycle information.

The basic operating principle of the PWM controller 36 of FIG. 6 is briefly explained with reference to FIGS. 5 and 6 in the following. In general, the controller 36 controls the duty cycle of the PWM signal S35 such that the error signal $S_{ERR}$ is zero, so that the input signal corresponds to the reference signal $S3_{REF}$. Assume that the input signal S3 has been adjusted to a signal level represented by the reference signal $S3_{REF}$ and that the input signal S3 or the reference signal $S3_{REF}$ changes, so that the input signal S3 may need to be re-adjusted. For explanation purposes, it is assumed that the input signal S3 is the input voltage signal $S_{V2}$ and that the input voltage V2 is to be increased as defined by the reference signal $S3_{REF}$. In this case the controller 36 reduces the duty cycle of the drive signal S35. Reducing the duty cycle of the drive signal S35 results in a decreasing (average) input current I31, where decreasing the input current I31, at a given input power received at the input 31, 32 of the second power converter circuit results in an increasing input voltage V2. Equivalently, the duty cycle is increased when the input voltage V2 is to be decreased or when the input current I31 is to be increased.

Figure 7:
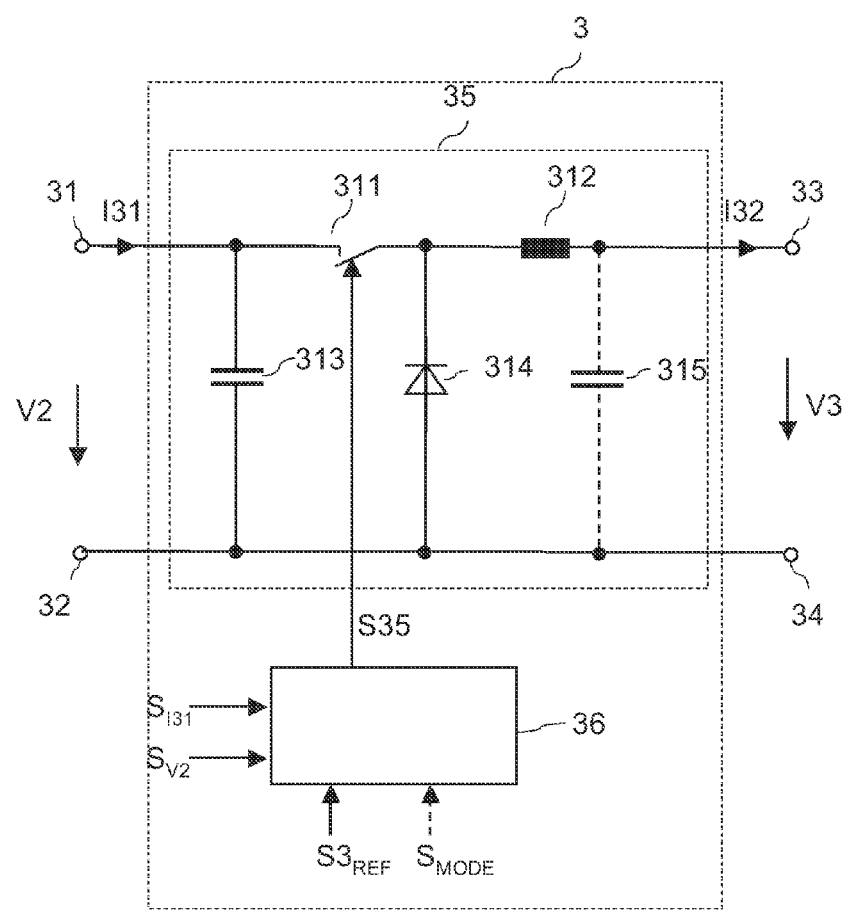
FIG. 7 shows another embodiment of a power converter stage of the second power converter circuit of FIG. 4.

FIG. 7 illustrates a further embodiment of a converter stage 35 that is configured to supply the output current I32 to a DC voltage grid. The converter 35 of FIG. 5 is implemented with a buck converter topology and includes a series circuit with an inductive storage element (an inductor) 312, such as a choke, and a switch 311 between the first input node 31 and the first output node 33. A freewheeling element 314, such as a diode, is connected between the second output node 34 and a circuit node common to the inductive storage element 312 and the switch 311. A first capacitive storage element 312, such as a capacitor, is connected between the input nodes 31, 32. A second capacitive storage element 305 connected between the output nodes 33, 34 is optional.

Like in the converter stage of FIG. 5, the switch 311 in the converter stage 35 of FIG. 7 can be implemented as a conventional electronic switch, such as a MOSFET or an IGBT, or could be implemented as a GaN-HEMT. Further, the freewheeling element 314 could be implemented as a synchronous rectifier.

Like in the converter stage 35 according to FIG. 5, the switch 311 in the converter stage of FIG. 7 is driven by a PWM drive signal S35 provided by the PWM controller 36. The PWM controller 36 can be implemented as explained with reference to FIG. 6 and increases the duty cycle of the drive signal S35 when the input voltage V2 is to be decreased or the input current I31 is to be increased, and decreases the duty when the input voltage V3 is to be increased or the input current I31 is to be decreased.

The converter stage 35 is, e.g., implemented with a boost topology (see FIG. 5) when the input voltage V2 is always below the grid voltage $V_{PG}$, and with a buck topology (see FIG. 7) when the input voltage V2 is always higher than the grid voltage $V_{PG}$. However, implementing the converter stage with one of a boost topology and a buck topology is only an example. The converter stage 35 could also be implemented with other non-isolating topologies, such as a buck-boost converter topology, or a boost-buck-converter topology, or with an isolating topology, such as a flyback converter topology, and so on.

The second power converter circuits of FIGS. 5 and 7 are unidirectional power converter circuits. That is, these power converter circuits are configured to transfer power only in one direction, that is from the input 31, 32 to the output 33, 34 in the present embodiment. However, these power converter circuits 3 can easily be modified to become bidirectional power converters by replacing the rectifier elements 303, 314 of FIGS. 5 and 7 with switches. In this case, the second power converter circuit can be operated to transfer power from the input 31, 32 to the output 33, 34, or to transfer power from the output 33, 34 to the input 31, 32.

According to one embodiment, the second power converter 3 is a bidirectional converter circuit. In this embodiment, the charge control circuit 4 can be configured to operate the second power converter circuit 3 such that the battery 2 is charged from a voltage V3 applied to the output 33, 34 of the second power converter circuit. In this case, the charge control circuit operates the second power converter circuit like a conventional battery charger that is configured to charge a battery either from a DC voltage or from an AC voltage Like in the battery charging modes explained before, the charge control circuit 4 can be configured to charge the battery in a constant current mode or a constant voltage when the charging the battery from the power grid.

Figure 8:
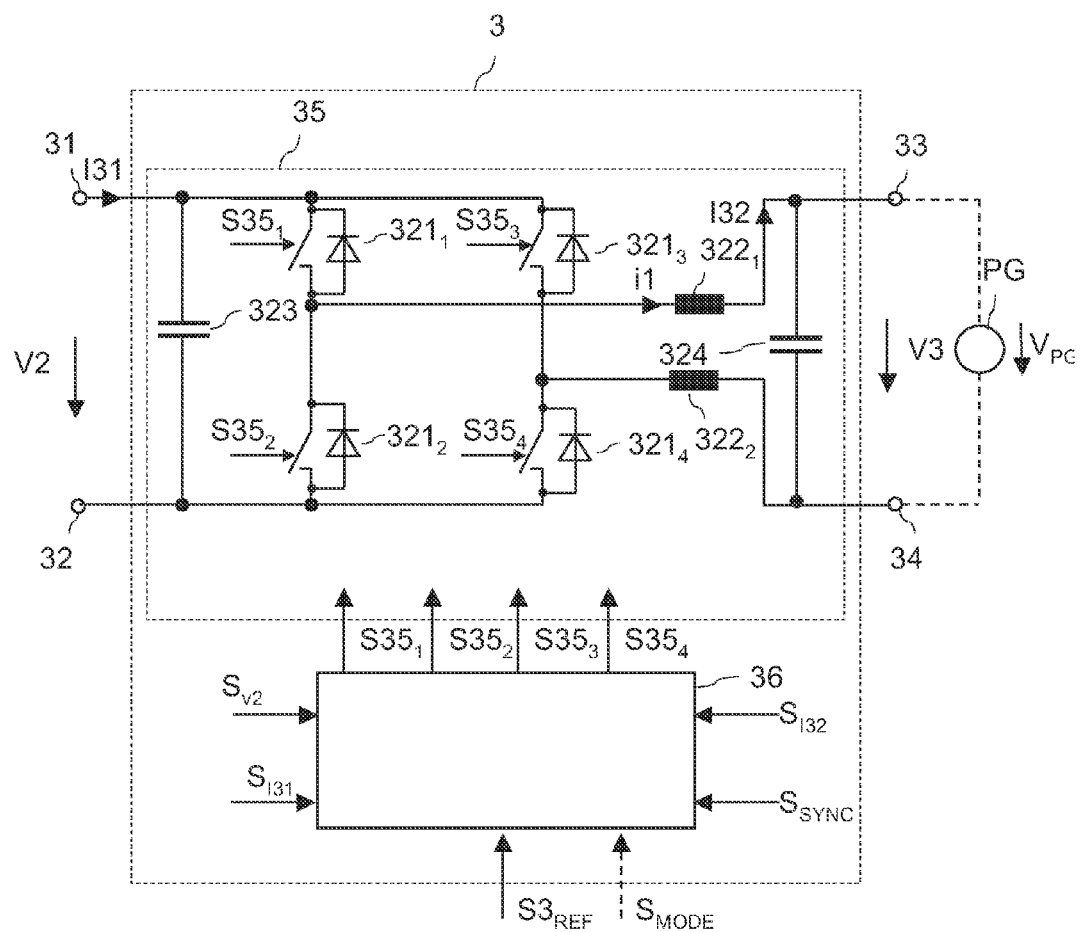
FIG. 8 shows a further embodiment of a power converter stage and of a PWM controller of the second power converter circuit of FIG. 4.

FIG. 8 illustrates one embodiment of a second power converter circuit 3 that is configured to supply the output current I32 to an AC voltage grid, or to receive an AC voltage from an AC voltage grid in order to charge the battery 2. In this embodiment, the converter stage 35 controlled by the PWM controller 36 is configured to generate the output current I32 as an alternating current with a signal waveform defined by an alternating synchronization signal $S_{SYNC}$. This synchronization signal $S_{SYNC}$ can be in phase with the grid voltage and can be generated by measuring the grid voltage $V_{PG}$. However, it is also possible to provide the synchronization signal $S_{SYNC}$ such that there is phase offset between the synchronization signal $S_{SYNC}$ and the grid voltage $V_{PG}$. An amplitude of the alternating output current I32 is variable and is dependent on an input power received by the second power converter circuit 3. Like the second power converter circuit 3 explained herein before, the second power converter circuit 3 of FIG. 8 controls one of the input current I31 and the input voltage V2 dependent on the input reference signal $S3_{REF}$ received from the charge control circuit 4 (not illustrated in FIG. 8).

The second power converter circuit supplying an alternating output current I32 and receiving a direct input voltage V2 and a direct input current I31 can be implemented like a conventional DC/AC converter (inverter) configured to supply an alternating current to a power grid. Nevertheless, one specific embodiment is explained with reference to FIG. 8 in the following.

Referring to FIG. 8, the converter stage 35 has a full-bridge (H4) converter topology and includes two half-bridge circuits each connected between the input nodes 31, 32. Each of these half-bridge circuits includes two switches each having a load path and a control terminal. The load paths of the two switches of one half-bridge circuit are connected in series between the input nodes 31, 32, where a first switch $321_1$ and a second switch $321_2$ form the first half-bridge, and a third switch $321_3$ and a fourth switch $321_4$ form the second half-bridge. Each of the half-bridges includes an output, where an output of the first half-bridge is formed by a circuit node common to the load paths of the first and second switch $321_1$, $321_2$. An output of the second half-bridge is formed by a circuit node common to the load paths of the third and fourth switch $321_2$, $321_4$. The output of the first half-bridge is coupled to the first output node 33 of the second power converter circuit 3 via a first inductive element $322_1$, such as a choke. The output of the second half-bridge is coupled to the second output node 33 of the second power converter circuit 3 via a second inductive element $322_2$, such as a choke. According to a further embodiment (not illustrated) only one of the first and second inductive elements $322_1$, $322_2$ is employed. The converter stage 35 further includes an input capacitor 323 connected between the input nodes 31, 32, and an optional output capacitor 324 connected between the output nodes 33, 34.

Each of the switches $321_1$, $321_2$, $321_3$, $321_4$ receives a control signal $S35_1$, $S35_2$, $S35_3$, $S35_4$ at its control node. These drive signals $S35_1$-$S35_4$ are provided by the PWM controller 36, and are pulse-width modulated (PWM) drive signals configured to switch the corresponding switch $321_1$-$321_4$ on and off. It should be noted that a switching frequency of the PWM signals $S35_1$-$S35_4$ is significantly higher than a frequency of the synchronization signal $S_{SYNC}$ and a desired frequency of the output current I32. The synchronization signal may be a sinusoidal signal with a frequency of 50 Hz or 60 Hz, depending on the country in which the power grid is implemented, while the switching frequency of the individual switches $321_1$-$321_4$ may be in the range of several kHz up to several 10 kHz, or even up to several 100 kHz.

The PWM controller is configured to individually adjust the duty cycle of each of the drive signals $S35_1$-$S35_4$ between 0 and 1 in order to have the waveform of the output current I32 follow the waveform of the synchronization signal and in order to control one of the input current I31, and the input voltage V2. When the duty cycle of one individual drive signal $S35_1$-$S35_4$ is 0, the corresponding switch $35_1$-$35_4$ is permanently switched off, and when the duty cycle of one individual drive signal $S35_1$-$S35_4$ is 1, the corresponding switch $35_1$-$35_4$ is permanently switched on. The duty cycle of a drive signal $S35_1$-$S35_4$ is the relationship between the time period for which the drive signal switches the corresponding switch and the duration of one switching cycle. The duration of one switching cycle is the reciprocal of the switching frequency.

Figure 9:
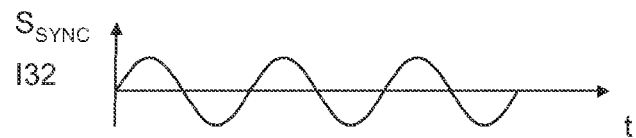
FIG. 9 schematically illustrates the waveform of a synchronization signal received by the PWM controller of FIG. 8.

According to one embodiment, the synchronization signal $S_{SYNC}$ is a periodic signal with positive and negative half-cycles that occur alternatingly. Consequently, the output current I32 is an alternating current with positive half-cycles in which the output current I32 is positive, and with a negative half-cycles in which the output current I32 is negative. One embodiment of the synchronization signal $S_{SYNC}$ and the corresponding output current I32 is illustrated in FIG. 9.

Two possible operating principles of the converter stage 35 are briefly explained in the following. First, it is assumed that a positive half-cycle of the output current I32 is to be generated. According to a first operating principle, which is known as bipolar switching or 2-level switching, the first and fourth switches $321_1$, $321_4$ are switched on and off synchronously, while the second and third switches $321_2$, $321_3$ are permanently switched off. During an on-phase of the first and fourth switches $321_1$, $321_4$ an output current I32 is forced through the choke(s) $322_1$, $322_2$ that is dependent on the voltage difference between the input voltage V2 across the input capacitor 323 and the output voltage V3, where the output voltage V3 is defined by the power grid voltage $V_{PG}$. The switches $321_1$-$321_4$ each include a freewheeling element, such as a diode, that is also illustrated in FIG. 8. The freewheeling elements of the second and third switches $321_2$, $321_3$ take the current flowing through the choke(s) $322_1$, $322_2$ when the first and fourth switches $321_1$, $321_4$ are switched off. In this method, the instantaneous signal level of the output current I32 can be adjusted through the duty cycle of the synchronous switching operation of the first and fourth switches $321_1$, $321_4$.

The switching frequency of the first and fourth switches $321_1$, $321_4$ is much higher than the frequency of the output current I32, so that amplitude, frequency and phase of the output current I32 can be adjusted dependent through the duty cycle of the synchronous switching operation of the first and fourth switches $321_1$, $321_4$. During the negative half-cycle the second and third switches $321_2$, $321_3$ are switched on and off synchronously, while the first and fourth switches $321_1$, $321_4$ are permanently off, so that the body diodes of these first and fourth switches $321_1$, $321_4$ are conducting. Alternatively, the switches $321_1$, $321_4$ are switched (with short dead times) when their body diodes are forward biased, so as to be operated as synchronous rectifiers.

According to a second operating principle, which is known as phase chopping or 3-level switching, the first switch $321_1$ is permanently switched on during the positive half cycle of the output current I32, the second and third switches $321_2$, $321_3$ are permanently off, and the fourth switch $321_4$ is switched on and off in a clocked fashion. During an on-phase of the first and fourth switches $321_1$, $321_4$ an output current I32 is forced through the choke(s) $322_1$, $322_2$ that is dependent on voltage difference between the input voltage V2 across the input capacitor 323 and the output voltage V3, where the output voltage V3 is defined by the power grid voltage $V_{PG}$. During an off-phase of the fourth switch $321_4$ a freewheeling path is offered by the freewheeling element of the third switch $321_3$ and the switched-on first switch $321_1$ thus enabling a zero volt state across the output chokes $322_1$-$322_2$. In this method, the amplitude of the output current I32 can be adjusted through the duty cycle of the switching operation of the fourth switch $321_4$. During the negative half-cycle the first and fourth switches $321_1$, $321_4$ are permanently switched off, the second switch $321_2$ is permanently switched on, and the third switch $321_3$ is switched on and off in a clocked fashion.

In order to control an instantaneous signal level of the output I32, the PWM controller 36 varies the duty cycle of the at least one switch that is switched on and off in a clocked fashion. The duty cycle of the at least one clocked switch and the duty cycle of its drive signal, respectively, is increased in order to increase the signal level of the output current I32 and is decreased in order to decrease the amplitude of the output current I32. This duty cycle is dependent on the instantaneous signal level of the synchronization signal $S_{SYNC}$. The switches $321_1$-$321_4$ may be implemented as conventional electronic switches, such as MOSFETs, IGBTs, GaN-HEMTS, or the like.

Figure 10:
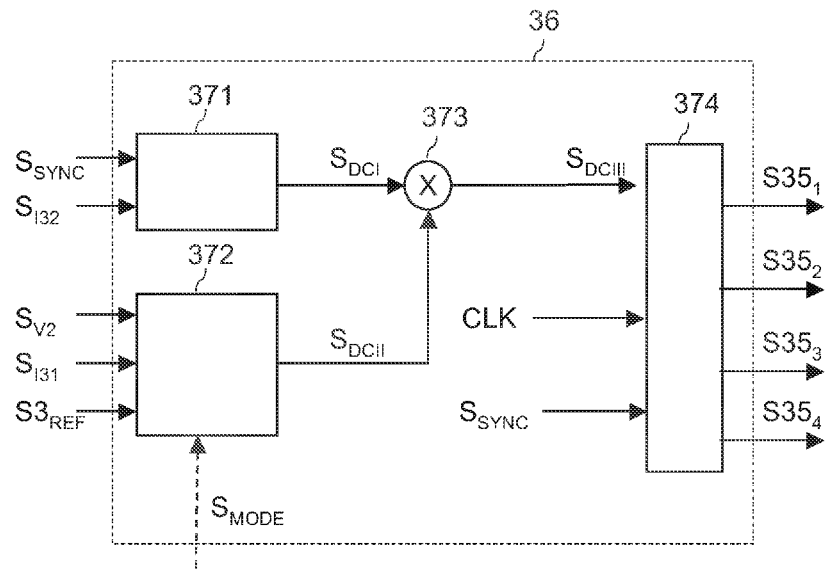
FIG. 10 shows one embodiment of the PWM controller of FIG. 8 in greater detail.

FIG. 10 schematically illustrates an embodiment of the PWM controller 36 that generates the PWM drive signals $S35_1$-$S35_4$. FIG. 10 shows a block diagram of the PWM controller 36 in order to illustrate its operating principle. It should be noted that the block diagram illustrated in FIG. 10 merely serves to illustrate the functionality of the PWM controller 36 rather than its implementation. The individual function blocks, that will be explained in further detail below, may be implemented using a conventional technology that is suitable to implement a controller. Specifically, the function blocks of the PWM controller 36 may be implemented as analog circuits, digital circuits, or may be implemented using hardware and software, such as a microcontroller on which a specific software is running in order to implement the functionality of the PWM controller 36.

Referring to FIG. 10, the PWM controller 36 includes a first control loop with a first controller 371 that receives the synchronization signal $S_{SYNC}$ and an output current signal $S_{I32}$ representing the output current I32. The first controller 371 is configured to evaluate a frequency of the synchronization signal $S_{SYNC}$ and a phase difference between the synchronization signal $S_{SYNC}$ and the output current signal $S_{I32}$ and is configured to generate a first duty cycle signal $S_{DCI}$. The first duty cycle signal $S_{DCI}$ controls the signal waveform of the output current I32 to correspond to the signal waveform of the synchronization signal $S_{SYNC}$. Referring to the explanation above, the synchronization signal $S_{SYNC}$ can be in phase with the grid voltage, or there can be a phase difference between the synchronization signal $S_{SYNC}$ and the grid voltage $V_{PG}$.

The PWM controller 36 further includes a second control loop with a second controller 372 that receives the input reference signal and at least one of the input current signal $S_{I31}$ and the input voltage signal $S_{V2}$. Optionally, when the second power converter circuit 3 supports constant current charging and constant voltage charging, the second controller 372 receives the operation mode signal $S_{MODE}$. The second controller 372 is configured to generate a second duty cycle signal $S_{DCII}$ that controls a signal level of the input signal (the input voltage V2 or the input current I31) such that the signal level corresponds to a signal level as defined by the input reference signal $S3_{REF}$. The second duty cycle signal corresponds to the duty cycle signal $S_{DC}$ of FIG. 6. The second controller 372 can therefore include those circuit blocks of the controller 36 of FIG. 6 that generate the duty cycle signal $S_{DC}$. Those circuit blocks are the optional multiplexer (361 in FIG. 6), the error signal calculator (362 in FIG. 6), and the filter (363 in FIG. 6).

The first control loop can be a relatively fast control loop and the first duty cycle signal $S_{DCI}$ can be a duty cycle signal that varies rapidly in order to control the output current I32 such that the output current I32 has an alternating waveform as defined by the synchronization signal $S_{SYNC}$. The second control loop that controls the signal level of the input signal can be relatively slow as compared with the first control loop.

Referring to FIG. 10, a multiplier 373 receives the first and second duty cycle signals $S_{DCI}$, $S_{DCII}$ and outputs a third duty cycle signal $S_{DC}$. A PWM driver 374 receives the third duty cycle signal $S_{DCIII}$ and a clock signal CLK and generates the drive signals $S35_1$-$S35_4$ using the duty cycle signal $S_{DCIII}$. The duty cycle signal $S_{DCIII}$ does not include the information whether a positive or a negative half-period of the output current I32 is to be generated. The PWM driver 374 further receives the synchronization signal $S_{SYNC}$ that includes this information. Depending on the specific drive scheme supported by the PWM driver 374, the PWM driver 374 generates at least one of the drive signals $S35_1$-$S35_4$ with a duty cycle defined by the duty cycle signal $S_{DCIII}$. For example, when the PWM driver 374 operates the converter stage 35 in the 2-level mode the drive signals $S35_1$, $S35_4$ of the first and fourth switches $321_1$, $321_4$ are generated with a duty cycle as defined by the duty cycle signal $S_{DCIII}$ during a positive half-period of the output current I32, and during a negative half-period of the output current I32, the drive signals $S35_2$, $S35_3$ of the second and third switches $321_2$, $321_3$ are generated with a duty cycle as defined by the duty cycle signal $S_{DCIII}$.

During the positive half-period, the first and fourth switches $321_1$, $321_4$ are switched on and off synchronously, while the second and third switches $321_2$, $321_3$ are permanently switched off. During an on-phase of the first and fourth switches $321_1$, $321_4$ an output current I32 is forced through the choke(s) $322_1$, $322_2$ that is dependent on the voltage difference between the input voltage V2 across the input capacitor 323 and the output voltage V3, where the output voltage V3 is defined by the power grid voltage $V_{PG}$. The switches $321_1$-$321_4$ each include a freewheeling element, such as a diode, that is also illustrated in FIG. 8. The freewheeling elements of the second and third switches $321_2$, $321_3$ takes the current flowing through the choke(s) $322_1$, $322_2$ when the first and fourth switches $321_1$, $321_4$ are switched off. In this method, the instantaneous signal level of the output current I32 can be adjusted through the duty cycle of the synchronous switching operation of the first and fourth switches $321_1$, $321_4$. However, it is also possible to operate the second and third switches $321_2$, $321_3$ as freewheeling elements. Equivalently, during the negative half-period, the second and third switches $321_2$, $321_3$ are switched on and off synchronously, while the first and fourth switches $321_1$, $321_4$ are switched off.

Figure 11:
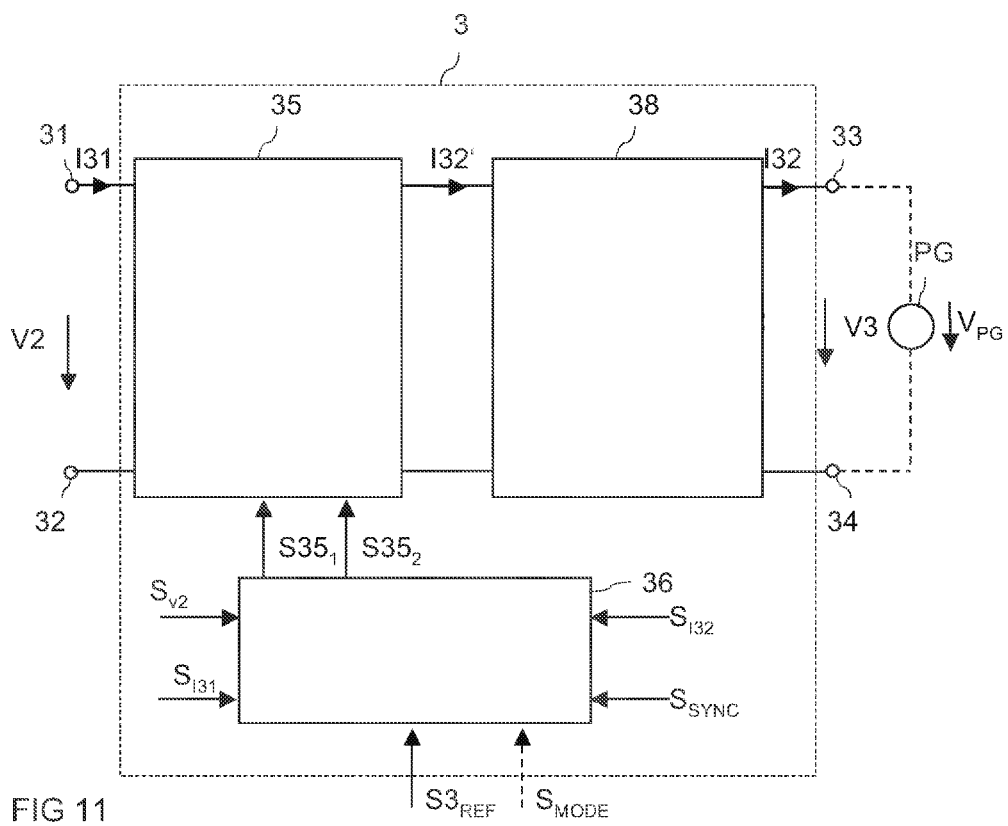
FIG. 11 shows a further embodiment of a power converter stage and of a PWM controller of the second power converter circuit of FIG. 4.

In the second power converter circuit 3 of FIG. 8, the converter stage 35 as controlled by the PWM controller 36 generates an alternating output current I32 that has a frequency and a phase defined by the synchronization signal $S_{SYNC}$. FIG. 11 illustrates a further embodiment of a second power converter circuit 3 configured to output the output current with an alternating waveform defined by the synchronization signal. The second power converter circuit 3 of FIG. 11 includes a converter stage 35 controlled by a PWM controller and an unfolding circuit 38 connected between the converter stage 35 and the output 33, 34 of the second power converter circuit 3. In this embodiment, the converter stage outputs a current I32' that corresponds to the rectified output current I32. That is, the output current I32' of the converter stage 35 has a signal waveform corresponding to the absolute value of the alternating output current I32. FIG. 12 schematically illustrates timing diagrams of the output current I32' of the converter stage 35 and of the alternating output current I32.

The converter stage 35 of FIG. 11 can be obtained from the converter stage 35 of FIG. 8 by omitting the third switch $321_3$ and by replacing the fourth switch $321_4$ with a permanent electrical connection. The second inductor $322_2$ can be omitted. The PWM controller 36 of FIG. 11 may correspond to the PWM controller of FIG. 10 with the difference that only the first and second drive signals $S35_1$, $S35_2$ are generated.

The unfolding bridge 38 can be a conventional unfolding bridge that generates an alternating output current I32 from the rectified output current I32'. According to one embodiment, the unfolding bridge 38 receives the synchronization signal $S_{SYNC}$ and is configured to generate a positive half-period or a negative half-period of the output current I32 dependent on the synchronization signal $S_{SYNC}$.

Although the second power converter circuit 3 of FIG. 8 has a non-isolating topology, it is also possible to implement the second power converter circuit 3 with an isolating topology, that is with a topology comprising a transformer or other technique for galvanically isolating circuits from one another. Embodiments of bidirectional DC/AC converters are commonly known and can be used as the second power converter circuit 3. Those bidirectional DC/AC converters are, for example, disclosed in Everts, J.; Krismer, F.; Van den Keybus, J.; Driesen, J.; Kolar, J. W., "Comparative evaluation of soft-switching, bidirectional, isolated AC/DC converter topologies," *Applied Power Electronics Conference and Exposition (APEC)*, 2012 Twenty-Seventh Annual IEEE, pp. 1067-1074, Feb. 5-9, 2012, which is incorporated by reference herein in its entirety. The bidirectional nature of these converters does not only allow to transfer power from the input 31, 33 to the output 33, 34 of the second power converter circuit, but also allows to transfer power from the output 33, 34 to the input 31, 32 in order to charge the battery from the power grid.

According to one embodiment, the first power converter circuit 1 is configured to supply the output power available at its output 13, 14 from a power source. According to one embodiment, the power source includes a photovoltaic (PV) module arrangement. FIG. 13 schematically illustrates one embodiment of a first power converter circuit 1 configured to supply the output current I12 from a PV module arrangement 5.

The PV module arrangement 5 is only schematically illustrated in FIG. 13. This PV module arrangement 5 includes at least one solar cell (photovoltaic cell). Some exemplary embodiments of a PV module arrangement 5 including at least one solar cell are illustrated in FIGS. 14A to 14C. Referring to a first embodiment illustrated in FIG. 14A, the PV module arrangement 5 includes only one solar cell $5_1$. Referring to a second embodiment illustrated in FIG. 14B, the PV module arrangement 5 includes a string of r solar cells $5_1$-$5_r$, wherein r>1, connected in series. According to yet another embodiment illustrated in FIG. 5C, s strings of solar cells are connected in parallel, wherein s>1. Each of these strings includes r solar cells $5_{11}$-$5_{r1}$, $5_{1s}$-$5_{rs}$. The embodiments illustrated in FIGS. 14A to 14C are only exemplary. Many other solar cell arrangements can be used as well as the PV module arrangement 5 coupled to the first power converter circuit 1.

Instead of connecting single solar cells in series (as illustrated in FIG. 14B) or instead of series circuits with single solar cells in parallel (as illustrated in FIG. 14C), cell arrangements that each include a plurality of solar cells could be connected in series, or series circuits with those arrangements could be connected in parallel. That is, in the embodiments of FIGS. 14A to 14C, each of the solar cells could be replaced by an arrangement with a plurality of PV modules (each comprising about 72 solar cells) in order to form the PV module arrangement 5.

The first power converter circuit 1 is not restricted to have a power source implemented as a PV module connected to the input 11, 12. Other types of power sources, in particular other types of DC power sources can be used as well.

Referring to the explanation provided before, the output voltage of the first power converter circuit 1 corresponds to the battery voltage V2, and the input voltage of the first power converter circuit 3, respectively. This battery voltage V2 is either defined by the charging state of the battery 2 in the constant charging mode and in the discharging mode, or is defined by the second power converter circuit 3 when the battery 2 is operated in the constant voltage mode. The output current I12 of the first power converter circuit 1 varies dependent on an input power supplied by the PV module arrangement 5 to the power converter circuit 1.

Referring to FIG. 13, the first power converter circuit 1 includes an input with a first input node 11 and a second input node 12 coupled to the PV module arrangement 5. In the embodiment of FIG. 13, the first power converter circuit 1 receives two input signals, namely an input current I11 and an input voltage V1. The input power received by the first power converter circuit 1 corresponds to the product of the input current I11 and the input voltage V1, that is:

$$P1_{IN} = V1 * I11 \quad (3).$$

The first power converter circuit 1 is implemented as switched-mode converter and includes at least one switched-mode power converter unit 10 coupled between the input 11, 12 and the output 13, 14 of the first power converter circuit 1. According to one embodiment, the power converter unit 10 is configured to control one of the input current I11 and the input voltage V1 in order to receive a maximum input power from the PV module arrangement 5.

It is commonly known that a solar cell and, therefore, the PV module arrangement 5 including several solar cells, acts like a power generator providing a direct output voltage (DC output voltage) and a direct output current (DC output current) when it is exposed to sunlight. For a given light power received by the PV module arrangement 5 there is a range of output currents and a range of corresponding output voltages at which the PV module can be operated. An output current and an output voltage at which the output power assumes its maximum may be described as a maximum power point (MPP). The MPP varies dependent on the light power received by the PV module and dependent on the temperature. Thus, by suitably controlling one of input current I11 and the input voltage V1 of the first power converter circuit 1, the PV module arrangement 5 can be operated in the MPP so as to supply a maximum input power to the first power converter circuit 1.

Figure 15:
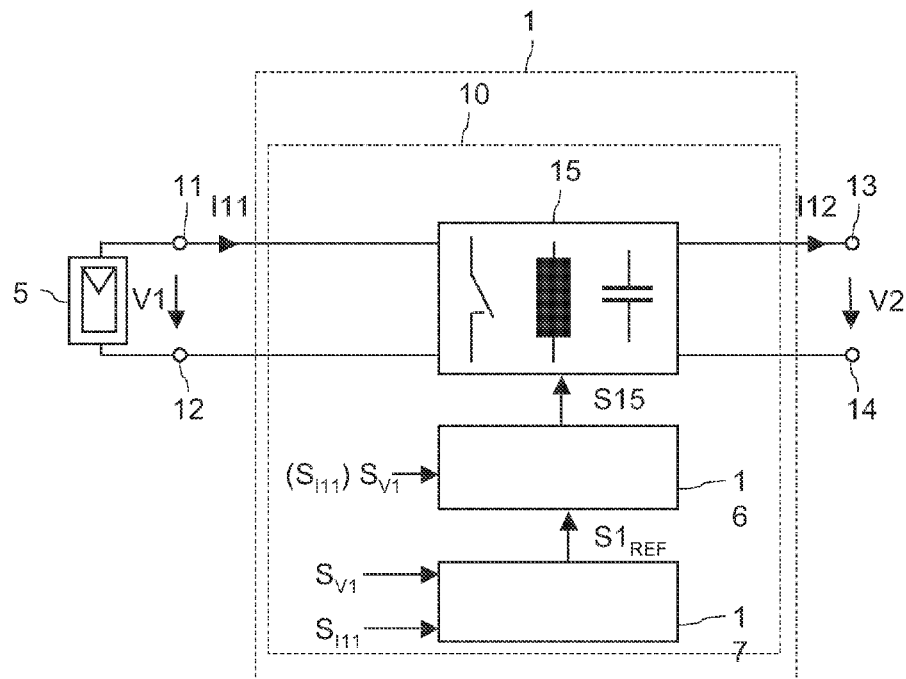
FIG. 15 shows one embodiment of the power converter unit in greater detail.

One embodiment of the power converter unit 10 of FIG. 13 is schematically illustrated in FIG. 15. The converter unit 10 of FIG. 15 is similar to the power converter circuit 3 of FIG. 4 and includes a switched-mode converter stage 15 that is configured to receive the input current I11 and the input voltage V1 of the first power converter stage and to supply the output current I12. The converter stage 15 includes at least one switch that is switched on and off in pulse-width modulated (PWM) fashion, at least one inductor, and at least one capacitive storage element (capacitor). The power converter unit 10 further includes a PWM controller 16 that is configured to receive one of an input current signal $S_{I11}$ and an input voltage $S_{V1}$ of the first power converter circuit 1. The input current signal $S_{I11}$ represents the input current I11 of the first power converter circuit 1 and can be obtained in a conventional way by measuring the input current I11. The input voltage signal $S_{V1}$ represents the input voltage V1 of the first power converter circuit 1 and can be obtained in a conventional way by measuring the input voltage V1. A measurement circuit for measuring the one of the input current I11 and the input voltage V1 and for providing the corresponding measurement signal $S_{I11}$ and $S_{V1}$, respectively, are not illustrated in FIG. 15.

Referring to FIG. 15, the PWM controller 16 further receives a reference signal $S1_{REF}$ that defines the desired signal level of the input signal to be controlled. For explanation purposes, it is assumed that the input voltage V1 is to be controlled by the converter unit 10. In this case, the PWM controller 16 receives the input voltage signal $S_{V1}$, and the reference signal $S1_{REF}$ defines a desired signal level of the input voltage V1. The PWM controller 16 is configured to generate a PWM drive signal S15 received by the converter stage 15 such that the input voltage has a signal level as defined by the reference signal $S1_{REF}$.

The converter unit 10 of FIG. 15 further includes a Maximum Power Point Tracker (MPPT) 17 that is configured to generate the reference signal $S1_{REF}$ such that converter unit 10 operates the PV module arrangement 5 in the MPP. The MPPT 17 receives the input current signal $S_{I11}$ that represents the input current I11, and the input voltage signal $S_{V1}$ that represents the input voltage V1. From the input current signal $S_{I11}$ and the input voltage signal $S_{V1}$ the MPPT 17 calculates the instantaneous input power supplied by the PV module arrangement 5 to the first power converter circuit 1. The MPPT 17 is configured, in a detection cycle, to vary a signal level of the reference signal $S1_{REF}$ within a given signal range and to determine the input power provided by the PV module arrangement 5 for each of the different signal levels defined by the reference signal $S1_{REF}$. The MPPT 17 is further configured to detect the input voltage V1 for which the maximum input power has been obtained, and to finally set the reference signal $S1_{REF}$ to that value for which the maximum input power has been detected, until a new detection cycle starts. Detecting the MPP in one detection cycle may include a conventional algorithm for detecting the maximum power point, such as, for example, a "hill climbing algorithm" or a "perturb-and-observe algorithm."

Since the solar energy received by the DC source implemented as the PV module arrangement 5 may vary, the MPPT 17 is further configured to check whether the DC source 5 is still operated in its maximum power point. Thus, the MPPT 17 starts the detection cycle either regularly or when there is an indication that the maximum power point might have changed. One example of an indication that the maximum power point might have changed if the input current I11 represented by the input signal $S_{I11}$ changes without the reference signal $S1_{REF}$ having changed.

Like the converter stage 35 explained with reference to FIGS. 5, 7 and 8, the converter stage 15 of FIG. 15 can be implemented with a conventional topology, such as a boost topology, a buck topology, a buck-boost topology, a flyback topology, or the like.

Figure 16:
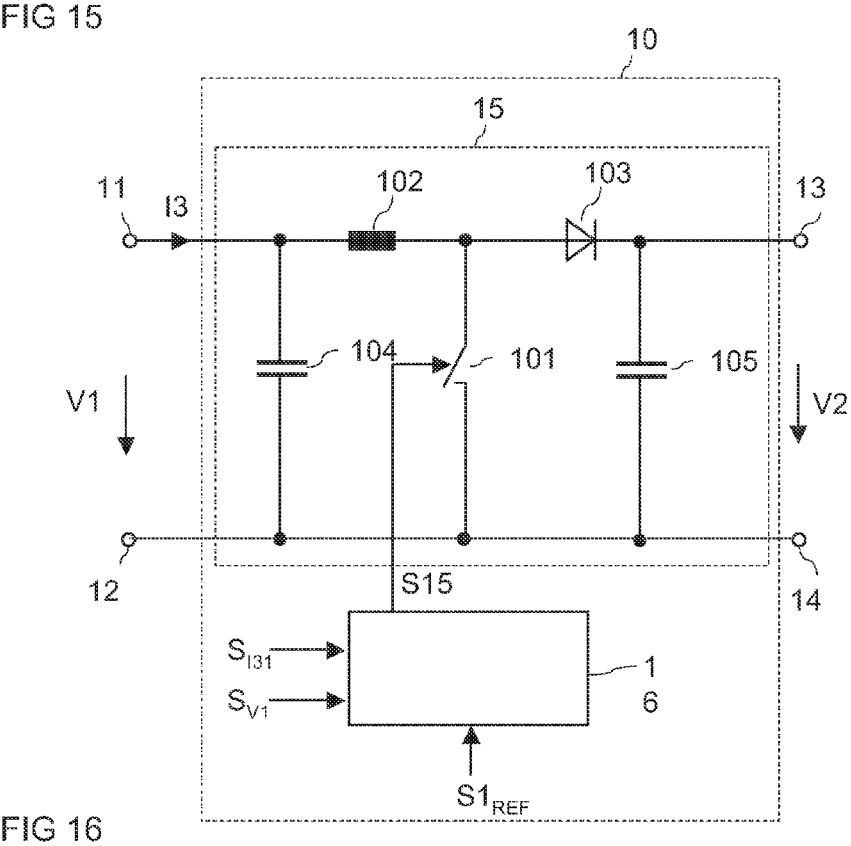
FIG. 16 shows one embodiment of a power converter stage of the power converter unit of FIG. 15.

For explanatory purposes, one example of a converter stage 15 with a boost topology is illustrated in FIG. 16. The MPPT 17 is not illustrated in FIG. 16. Referring to FIG. 16, the converter stage 15 includes a series circuit with an inductive storage element 102, such as a choke, and a switch 101 between the input nodes 11, 12. Further, a rectifier element 103, such as a diode, is connected between a circuit node common to the inductive storage element 102 and the switch 101 and the first output node 13. The second output node 14 is connected to the second input node 12. A first capacitive storage element 104, such as a capacitor, is connected between the input nodes 11, 12. Optionally, a second capacitive storage element 105, such as a capacitor, is connected between the output nodes 13, 14.

The switch 101 can be implemented as a conventional electronic switch, such as a MOSFET or an IGBT. The rectifying element 103 could be implemented as a synchronous rectifier, which is a rectifier implemented using an electronic switch, such as a MOSFET or an IGBT. According to a further embodiment, the switch 101 is implemented as GaN-HEMT.

Referring to FIG. 16, the switch 101 receives the PWM signal S15 from the PWM controller 16 as a drive signal, wherein the PWM controller 16 is configured to adjust a duty cycle of the PWM drive signal S15 such that the input signal (the input voltage V1) has a signal level as represented by the reference signal $S1_{REF}$ received from the MPPT.

Figure 17:
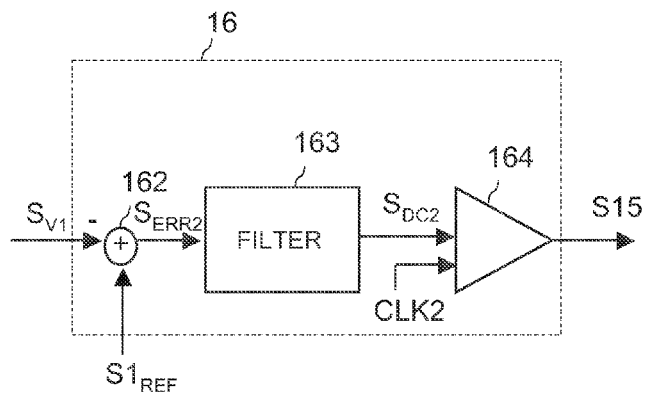
FIG. 17 shows one embodiment of a PWM controller of the power converter unit of FIG. 15.

The PWM controller 16 can be implemented like the PWM controller 36 of FIG. 6. One possible embodiment of the PWM controller 16 is illustrated in FIG. 17. In FIG. 17, functional blocks of the PWM controller 16 are illustrated. These functional blocks can be implemented as analog circuits, as digital circuits or can be implemented using hardware and software.

Referring to FIG. 17, the PWM controller 16 calculates an error signal $S_{ERR2}$ from the input signal, namely the input voltage signal $S_{V1}$ in the present embodiment, and the reference signal $S1_{REF}$ received from the MPPT 17. The error signal $S_{ERR2}$ is received by a filter 163 that generates a duty cycle signal $S_{DC2}$ from the error signal $S_{ERR2}$. The duty cycle signal $S_{DC2}$ represents the duty cycle of the drive signal S15 provided by the PWM controller 16. The filter 363 can be a conventional filter for generating a duty cycle signal $S_{DC2}$ from an error signal $S_{ERR2}$ in a PWM controller of a power converter stage, such as a P-filter, a PI-filter, or a PID-filter. A PWM driver 164 receives the duty cycle signal $S_{DC2}$ and a clock signal CLK2 and generates the drive signal S15. The drive signal S15 has a switching frequency as defined by the clock signal CLK2 and a duty cycle as defined by the duty cycle signal $S_{DC2}$. This driver 164 can be a conventional PWM driver as well known in the art that is configured to generate a PWM drive signal based on a clock signal and a duty cycle information.

Figure 18:
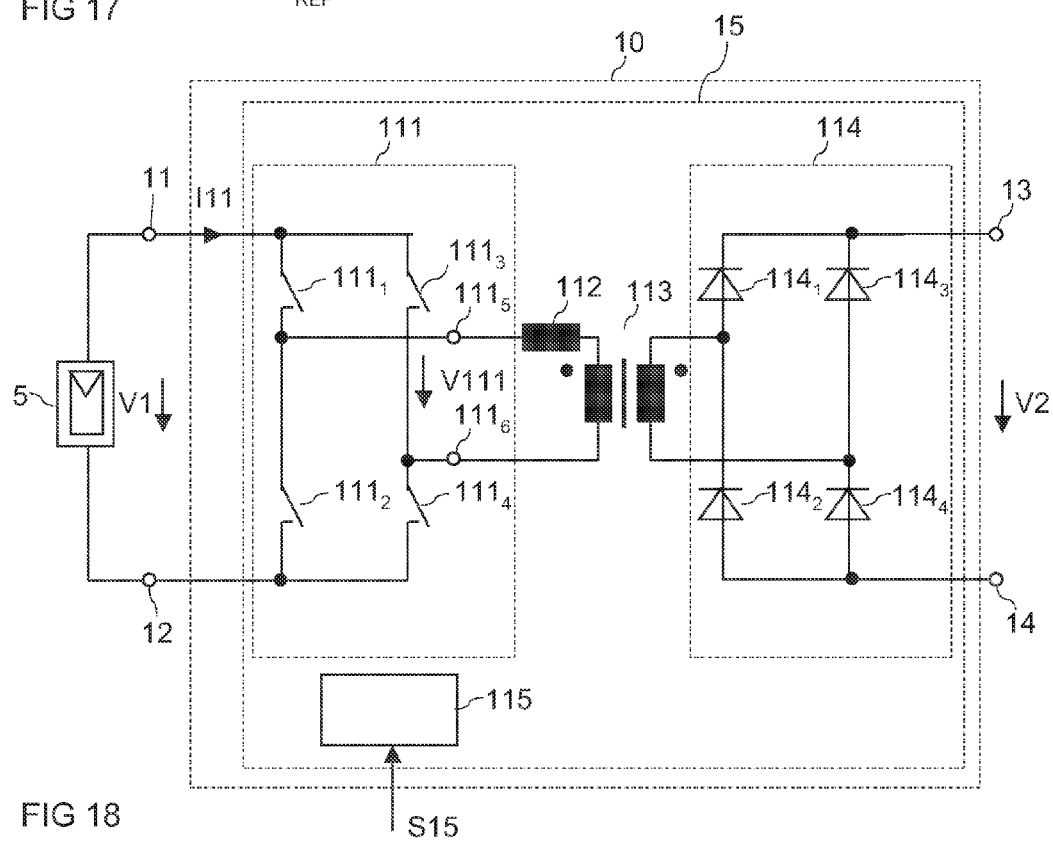
FIG. 18 shows another embodiment of a power converter stage of the power converter unit of FIG. 15.

FIG. 18 illustrates one embodiment of a power converter stage 15 that provides for a galvanic isolation between the input 11, 12 and the output 13, 14. The power converter stage 15 of FIG. 18 includes a bridge circuit 111 coupled to the input 11, 12 and configured to generate an alternating voltage V111 from the input voltage V1 received at the input 11, 12. The bridge circuit 111 includes two half-bridges that each include a high-side switch $111_1$, $111_3$ and a low-side switch $111_2$, $111_4$, wherein the high-side switch and the low-side switch of each half-bridge are connected in series, and each of the half-bridges is connected between the input nodes 11, 12 of the input. Each half-bridge includes an output $111_5$, $111_6$, which is a circuit node common to the load paths of the high-side switch and the low-side switch of each half-bridge. The alternating voltage V111 is available between the outputs $111_5$, $111_6$ of the bridge circuit 111.

The power converter stage 15 further includes an inductor 112 and a transformer 113 with a primary winding $113_1$ and a secondary winding $113_2$. The primary winding $113_1$ is connected in series with the inductor 112, wherein the series circuit with the inductor 112 and the primary winding $113_1$ is connected between the outputs $111_5$, $111_6$ of bridge circuit 111. The primary winding $113_1$ and the secondary winding $113_2$ have the same winding sense.

Further, a rectifier 114 is connected between the secondary winding $113_2$ and the output 13, 14 of the power converter stage 10. This rectifier circuit 114 is implemented as a bridge-rectifier and includes a first rectifier element $114_1$ connected between a first node of the secondary winding $113_2$ and a first output node 13, a second rectifier element $114_2$ connected between the second output node 14 and a second node of the rectifier element $113_2$, a third rectifier element connected between the second node of the rectifier element $113_2$ and the first output node 13, and a fourth rectifier element $114_4$ connected between the second output node 14 and the second node of the rectifier element $113_2$. The rectifier elements $114_1$-$114_4$ are implemented as diodes in the embodiment of FIG. 18. However, this is only an example, other types of rectifier elements, such as synchronous rectifiers including a MOSFET, may be used as well.

In the power converter stage 15 of FIG. 18, the bridge circuit 111 is configured to generate the alternating voltage V111 from the input voltage V1, the transformer 113 transmits an alternating voltage applied to the primary winding $113_1$ via the inductor 112 to the secondary winding $113_2$, and the rectifier 114 rectifies the alternating voltage available at the secondary winding $113_2$.

Figure 19:
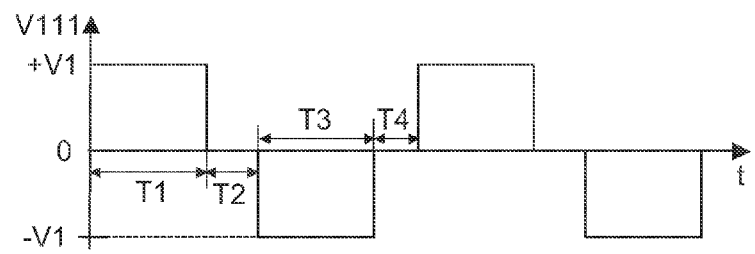
FIG. 19 illustrates the operating principle of the power converter stage of FIG. 18.

A timing diagram of the alternating voltage V111 generated by the bridge circuit 111 is schematically illustrated in FIG. 19. Referring to FIG. 19, the alternating voltage V111 assumes three different signal levels, namely a positive signal level +V1, a negative signal level −V1 and 0. The positive signal level +V1 is generated by switching on the first switch $111_1$ and the fourth switch $111_4$, the negative signal level is generated by switching on the second switch $111_2$ and the third switch $111_3$, and 0 is obtained by either switching on the first switch $111_1$ and the third switch $111_3$, or the second switch $111_2$ and the fourth switch $111_4$.

One switching cycle of the bridge circuit 111 includes a first time period T1 when the alternating voltage V111 has the positive level +V, a second time period following the first time period when the signal level is 0, a third time period T3 when the signal level is negative, and a fourth time period T4 when the signal level is 0. The switching operation has two duty-cycles, namely a first duty-cycle D1=T1/(T1+T2) defined by the first and second time periods T1, T2, and a second duty-cycle D2=T3/(T3+T4) defined by the third and fourth time periods T3, T4. According to one embodiment, the duty-cycles are equal, so that D1=D2.

Like in the embodiments explained before, the input voltage V2 of the power converter stage 15 can be controlled by controlling the duty-cycles D1, D2. These duty-cycles can be controlled in the same way as explained with reference to FIG. 17 before. In the converter stage 15 of FIG. 18, a driver circuit 115 receives the PWM drive signal and drives the switches $111_1$-$111_4$ in a PWM fashion in the way explained before.

Figure 20:
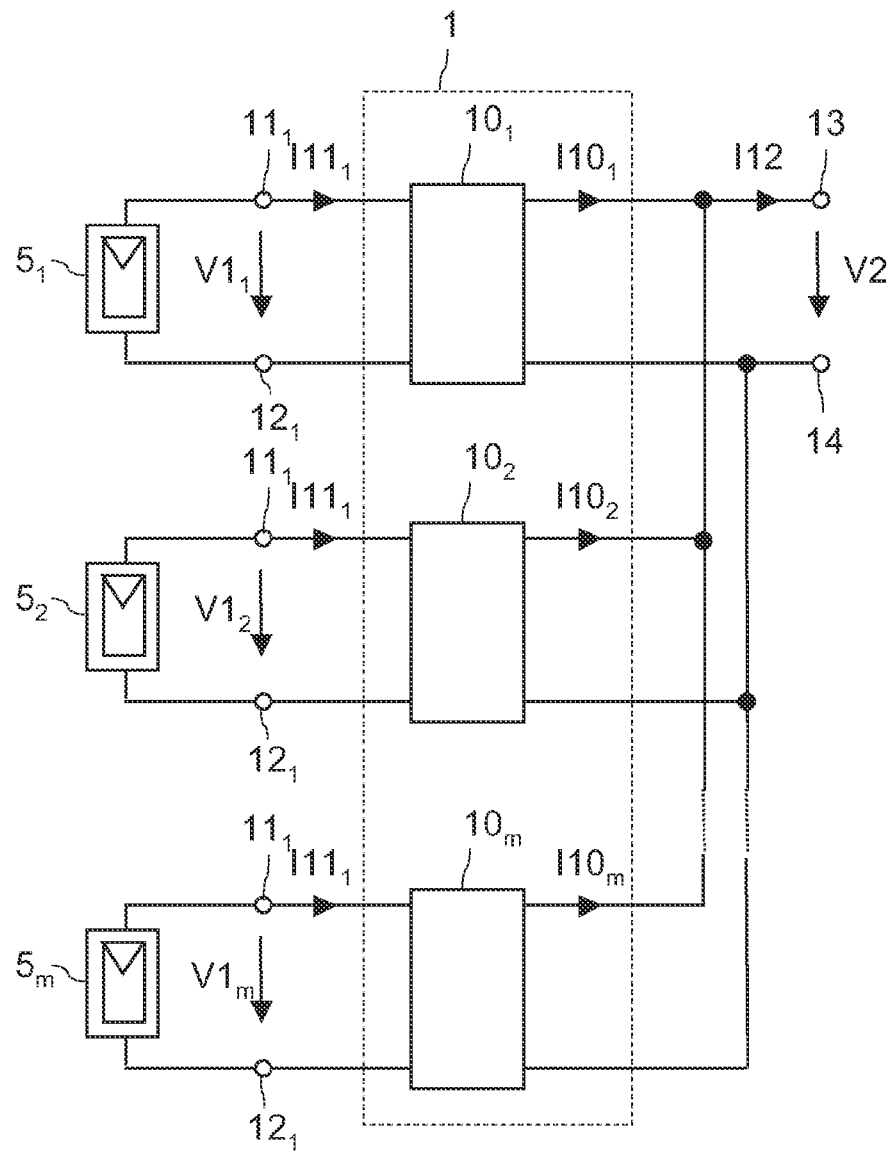
FIG. 20 shows another embodiment of a first power converter circuit.

FIG. 20 illustrates a further embodiment of the first power converter circuit 1. In this embodiment, the first power converter circuit 1 includes a plurality of inputs $11_1$, $12_1$-$11_m$, $12_m$ wherein one of a plurality of power sources $5_1$-$5_m$ is coupled to each of these inputs. Further, the first power converter circuit 1 includes a plurality of power converter units $10_1$-$10_m$, wherein converter unit $10_1$-$10_m$ is coupled to one of the power sources $5_1$-$5_m$ via one of the inputs. In FIG. 20, reference characters $V1_1$-$V1_m$ denote input voltages of the individual converter units $10_1$-$10_m$, and reference characters $I11_1$-$I11_m$ denote input currents of the individual converter units $10_1$-$10_m$. Each of the converter units $10_1$-$10_m$ can be implemented as explained with reference to FIGS. 13 to 15 before and is configured to output an output current $I10_1$-$I10_m$. Outputs of the individual converter units $10_1$-$10_m$ are coupled to the output 13, 14 of the first power converter circuit 1, so that the output current I12 of the first power converter circuit 1 corresponds to the sum of the output currents $I10_1$-$I10_m$ of the individual converter units $10_1$-$10_m$.

Figure 21:
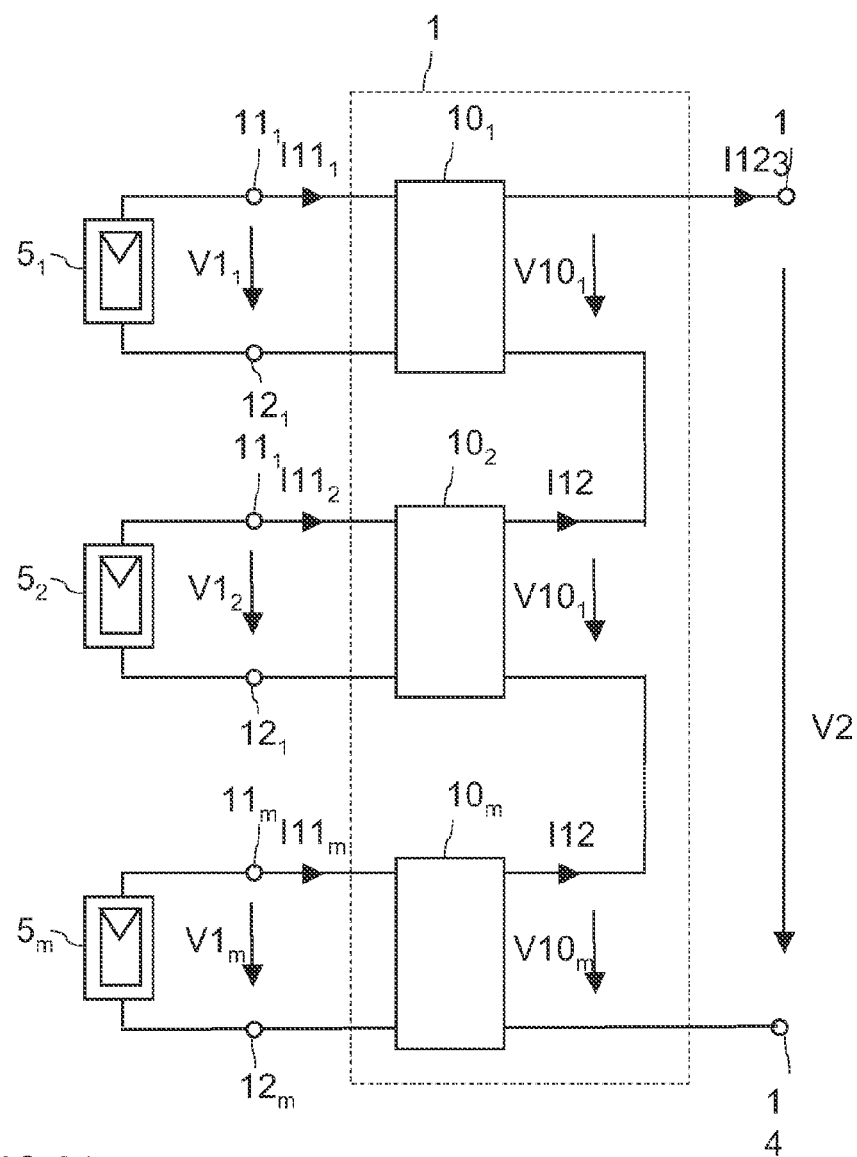
FIG. 21 shows another embodiment of a first power converter circuit.

FIG. 21 illustrates a further embodiment of the first power converter circuit 1. The first power converter circuit 1 of FIG. 21 is based on the power converter circuit of FIG. 20 and includes a plurality of the power converter units $10_1$-$10_m$ each coupled to a power source $5_1$-$5_m$. Outputs of the power converter units $10_1$-$10_m$ are cascaded between the output nodes 13, 14 of the of the first power converter circuit 1. Each of the power converter units $180_1$-$10_m$ supplies the output current I12, and each of the power converter units $10_1$-$10_m$ supplies a voltage $V10_1$-$V10_m$, wherein each of the voltages supplied by one power converter units $10_1$-$10_m$ is a portion of the output voltage V2 of the first power converter circuit 1, that is:

$$V2 = \sum_{i=1}^{m} V10_i. \qquad (4)$$

The individual power converter units $10_1$-$10_m$ can be implemented with a conventional converter topology. According to one embodiment, one of the power converter units $10_1$-$10_m$ acts as a master unit that defines the current level of the output current I12 dependent on the received input power, while the other second converter units act as slave units that control the level of their output current to correspond to the current level defined by the master power converter unit.

Referring to the explanation above a voltage level of the battery voltage V2 may vary between a minimum level $V2_{MIN}$ and a maximum value $V2_{MAX}$. The absolute voltage level of the battery voltage is dependent on the specific application. According to one embodiment, the second power converter circuit 3 supplies the output current into a power grid having a voltage of about $240V_{RMS}$. In this embodiment, the input voltage V2 of the second power converter circuit 3 is, for example, between 350V and 400V. This input voltage V2 is, for example, provided by a first power converter circuit 1 of FIG. 21 that includes a plurality of cascaded converter units $10_1$-$10_2$.

If it is desired to supply the output current I32 into a power grid, and if it is further desired to use a battery 2 with a voltage lower than the (peak) voltage of the power grid, a plurality of the electronic circuits explained herein before can be cascaded.

Figure 22:
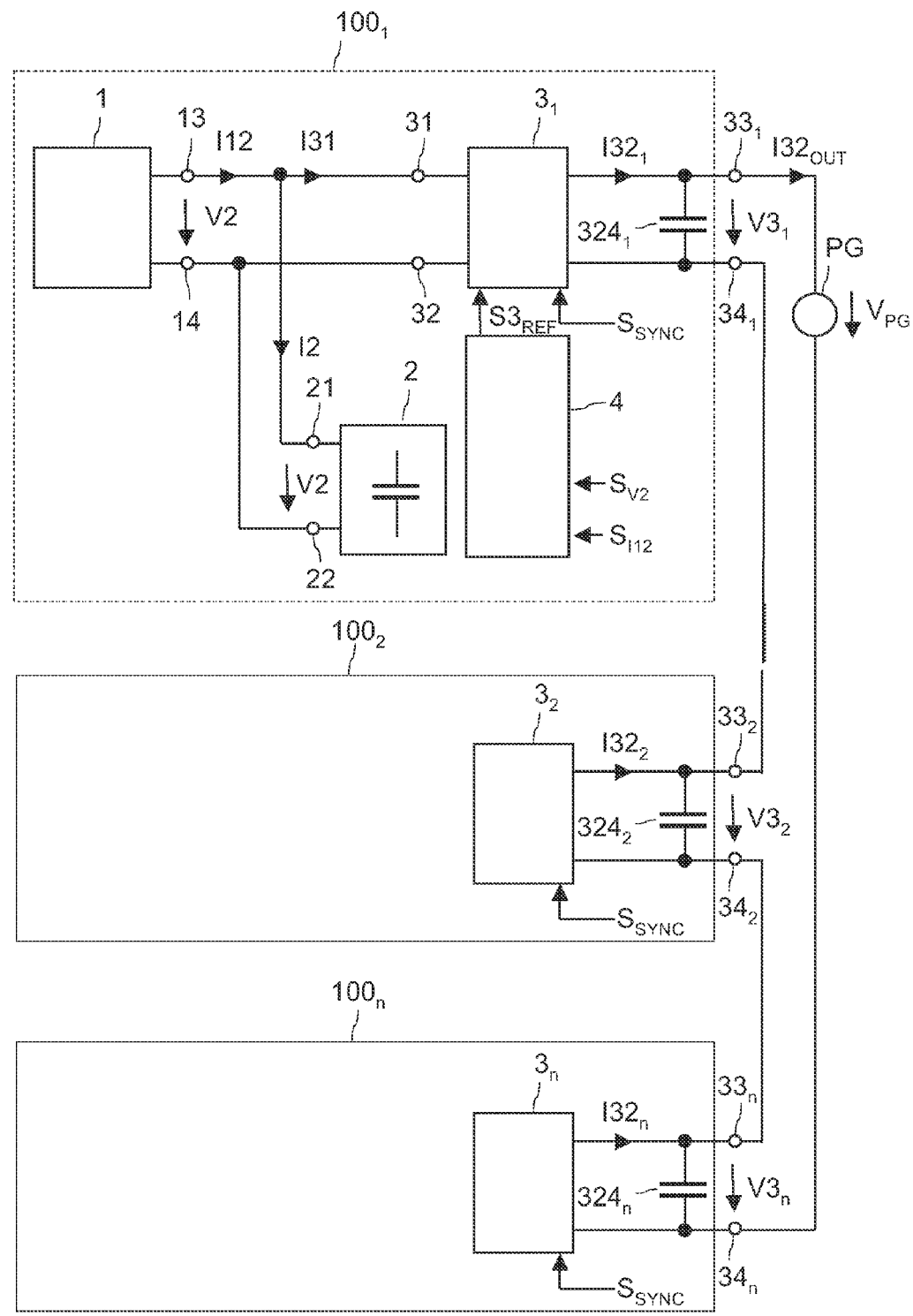
FIG. 22 shows a power converter arrangement with a plurality of cascaded electronic circuits.

FIG. 22 illustrates an embodiment of a power converter arrangement that includes a plurality of electronic circuits $100_1$-$100_n$. In FIG. 22, the electronic circuit $100_1$ corresponds to the electronic circuit shown in FIG. 1 as explained before. According to one embodiment, the other electronic circuits $100_2$, $100_n$ that are only schematically illustrated in FIG. 22 correspond to the first electronic circuit $100_1$. That is, each of these electronic circuits $100_2$-$100_n$ includes a battery (not illustrated in FIG. 22). However, it is also possible to implement one or more of the other electronic circuits $100_2$, $100_n$ without a battery.

When the power grid is an alternating power grid, the second power converter circuits 3 of the individual electronic circuits $100_1$-$100_n$ can be implemented in accordance with one of the embodiments explained with reference to FIGS. 8 through 12. The operating principle of a power converter arrangement that includes electronic circuits $100_1$-$100_n$ that are each configured to supply an output current into an AC power grid and that each include a second power converter circuit in accordance with FIG. 8 is explained below.

In FIG. 22, reference character $3_1$ denotes the second power converter circuit of the first electronic circuit $100_1$, reference characters $33_1$, $34_1$ denote output terminals of this second power converter circuit $3_1$, $I32_1$ denotes the output current of this second power converter circuit $3_1$, and $I32_{OUT}$ denotes the overall output current supplied to the power grid. From the other electronic circuits $100_2$, $100_n$ only the second power converter circuits $3_2$, $3_m$, each supplying an output current $I32_2$, $I32_n$ are shown. Referring to the explanation above, the individual second power converter circuits $3_1$-$3_n$ control their respective output current $I32_1$-$I32_n$ to be in phase with a synchronization signal $S_{SYNC}$. The individual second power converter circuits $3_1$-$3_n$ may each receive the same synchronization signal $S_{SYNC}$ or may receive different phase shifted versions of one synchronization signal, wherein the different phase-shifted versions of the synchronization signal are in phase. The output current $I32_1$-$I32_n$ of each second power converter circuit 3 is the current received at a circuit node common to the output capacitor $324_1$-$324_n$ and one of the output nodes $33_1$-$33_n$, $34_1$-$34_n$ of the corresponding second power converter circuit $3_1$-$3_n$.

The operating principle of the cascaded electronic circuits $100_1$-$100_n$ is explained below. For explanation purposes, it is assumed that the voltage $V_{PG}$ of the power grid is a sinusoidal voltage and that the synchronization signal is a corresponding sinusoidal signal that, wherein the synchronization signal $S_{SYNC}$ is in phase with the grid voltage $V_{PG}$, or wherein there is a phase difference between the synchronization signal $S_{SYNC}$ and the grid voltage.

Referring to the explanation above, each of the second converter units $3_1$-$3_n$ is configured to generate the corresponding output current $I32_1$-$I32_n$ to be in phase with the synchronization signal $S_{SYNC}$. In the steady state of the power converter arrangement the output current $I32_1$-$I32_n$ of each second power converter circuit $3_1$-$3_n$ corresponds to the overall output current $I32_{OUT}$ and the output voltage $V3_1$-$V3_n$ of each second power converter circuit $3_1$-$3_n$ is a portion of the grid voltage $V_{PG}$, wherein:

$$V_{PG} = \sum_{i=1}^{n} V3_i. \qquad (5)$$

The output voltages $V3_1$-$V3_n$ of the individual second power converter circuits $3_1$-$3_n$ can be different from each other, wherein the output voltage $V3_1$-$V3_n$ of each second power converter circuit is dependent on the input power received by the corresponding second power converter circuit $3_1$-$3_n$.

For explanation purposes, it is assumed that the input power of the second power converter circuit $3_1$ of the first electronic circuit $100_1$ decreases. Such a decrease may be due to a decrease of the input power of the first power converter circuit 1, or due to a charging process of the battery 2. The output voltage $V3_1$ of the corresponding second power converter circuit $3_1$ would then decrease, while the output voltages of the other second power converter circuits $3_2$, $3_n$ would increase in order to meet the condition defined by equation (5). Further, the common output current $I32_{OUT}$ would decrease. The transient process is as follows. When the input power received by the second power converter circuit $3_1$ decreases, the common output current $I32_{OUT}$ at first remains unchanged, while the output current $I32_1$ of the second power converter circuit $3_1$ decreases. The decrease of the output current $I32_1$ and the unchanged common output current $I32_{OUT}$ causes a discharging of the output capacitor $324_1$ of the second power converter circuit $3_1$ so that the output voltage $V3_1$ decreases. A decrease of the output voltage of the first converter unit, however, causes an increase of the output voltages $V3_2$, $V3_n$ of the other second power converter circuits $3_2$, $3_n$, which now decrease their output currents $I32_2$, $I32_n$ in order to keep their output powers equal their input powers. The transition processes finishes when a "new" common output current $I32_{OUT}$ has settled in to which the individual output currents $I32_1$-$I32_n$ correspond. This is a self-organizing and self-stabilizing process that does not require an additional control loop besides the control loops in the individual electronic circuits disclosed before.

Figure 23:
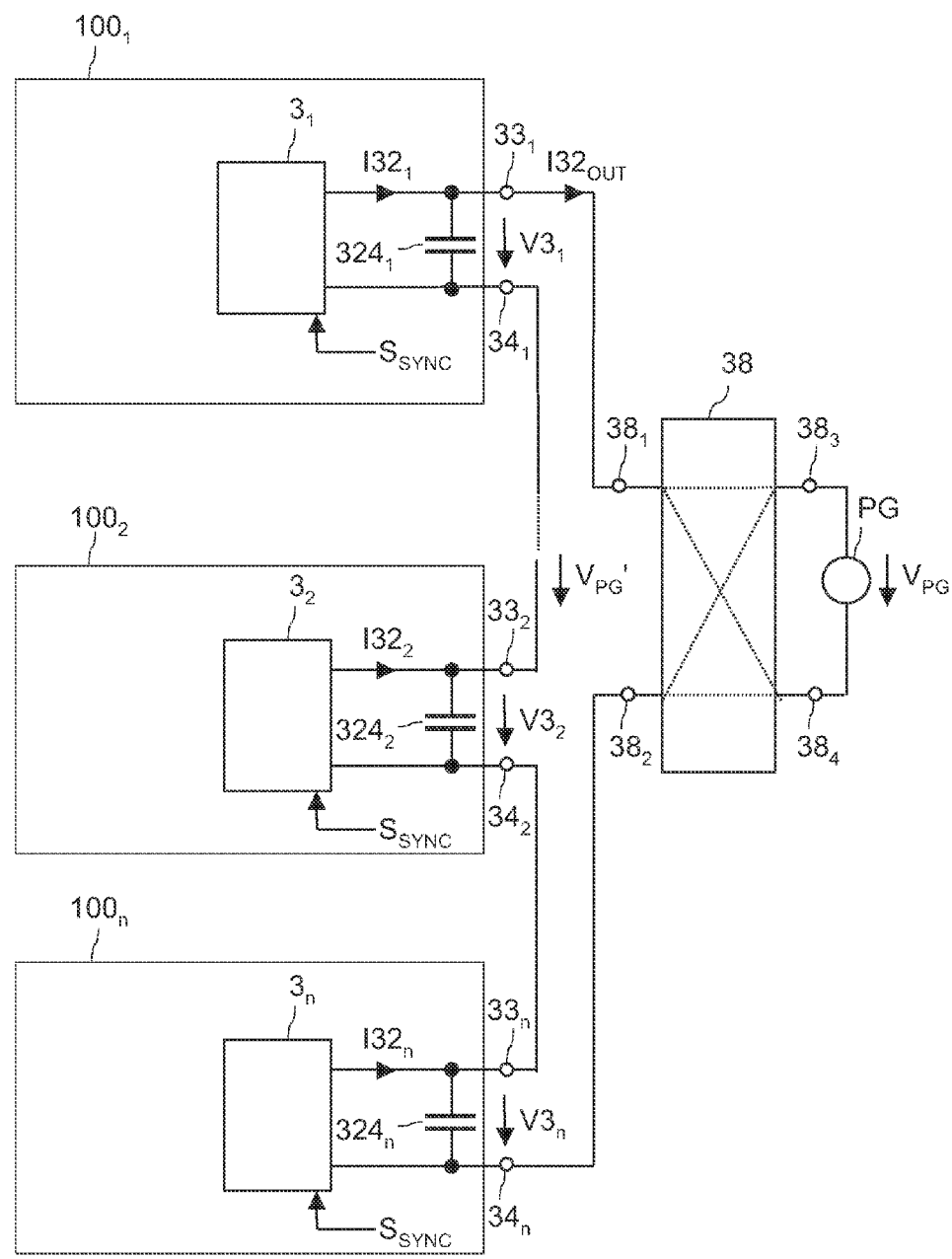
FIG. 23 shows a further embodiment of a power converter arrangement with a plurality of cascaded electronic circuits.

FIG. 23 illustrates a further embodiment of the power converter arrangement with a plurality of electronic circuits $100_1$-$100_n$. These electronic circuits $100_1$-$100_n$ are only schematically illustrated in FIG. 23. In this embodiment, the second power converter circuits $3_1$-$3_n$ each include a converter stage corresponding to the converter stage 35 in FIG. 11 and outputs a rectified output current $I32_1$-$I32_n$. A central unfolding circuit 38 supplies a rectified version $V_{PG}'$ to the cascaded electronic circuits $100_1$-$100_n$, receives an overall output current $I32_{OUT}'$ from the cascaded electronic circuits $100_1$-$100_n$ (which is also a rectified current and supplies an alternating current $I32_{OUT}$ to the grid. The unfolding bridge 38 has first and second input nodes $38_1$, $38_2$, and first and second output nodes $38_3$, $38_4$. The unfolding bridge can assume two different operation states, namely a first state in which the first input node $38_1$ is connected to the first output node $38_1$, and the second input node $38_2$ is connected to the second output node $38_4$, and a second state in which the first input node $38_1$ is connected to the second output node $38_3$, and the second input node $38_2$ is connected to the first output node $38_1$. The unfolding bridge 38, as controlled by the synchronization signal $S_{SYNC}$ or the grid voltage $V_{PG}$ alternatingly assumes the first and the second state.

In the description hereinbefore, directional terminology, such as "top," "bottom," "front," "back," "leading," "trailing" etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

What is claimed is:

1. A circuit comprising:
   a first power converter circuit comprising an output;
   a second power converter circuit comprising an input, an output, and a first control circuit, wherein
      the input of the second power converter circuit is coupled to the output of the first power converter circuit and is configured to receive an input signal from the first power converter circuit,
      the output of the second power converter circuit is configured to be coupled to a load, and
      the second power converter circuit is configured to deliver at the output of the second power converter circuit a first power;
   a rechargeable battery coupled to the output of the first power converter circuit and to the input of the second power converter circuit; and
   a second control circuit coupled to the first control circuit, the second control circuit configured to control charging the rechargeable battery during a charging mode by detecting a charge state of the rechargeable battery, and providing a reference signal based on the detected charge state to the first control circuit, wherein the reference signal represents a desired signal level of the input signal, and wherein the first control circuit is configured to limit the input signal based on the reference signal while the first power is positive.

2. The circuit of claim 1, wherein the input signal comprises an input current or an input voltage.

3. The circuit of claim 2, wherein the second control circuit is configured to measure a voltage at the rechargeable battery and to control the input current when a rechargeable battery voltage is below a voltage threshold.

4. The circuit of claim 3, wherein the second control circuit is configured to control the rechargeable battery voltage when the rechargeable battery voltage is above the voltage threshold.

5. The circuit of claim 1, further comprising an electronic switch coupled between the rechargeable battery and the output of the first power converter circuit.

6. The circuit of claim 1, wherein the first control circuit comprises a power converter unit configured to receive the input signal and to control the input signal.

7. The circuit of claim 6, wherein the power converter unit comprises a Maximum Power Point Tracker configured to generate a reference signal representing a desired signal level of the input signal received by the power converter unit.

8. The circuit of claim 6, wherein the first power converter circuit comprises a plurality of power converter units each comprising an output connected to the output of the first power converter circuit.

9. The circuit of claim 1, wherein the first control circuit controls switching of one or more transistors of the second power converter circuit based on the reference signal.

10. The circuit of claim 1, wherein the charging mode comprises a constant current charging mode and a constant voltage charging mode.

11. The circuit of claim 10, wherein the input signal comprises an input current, and wherein, during the constant current charging mode, the first control circuit is configured to control a charging current flowing through the rechargeable battery to be substantially constant by:
   when the charging current is higher than a reference current, increasing the input current; and
   when the charging current is lower than the reference current, decreasing the input current.

12. The circuit of claim 10, wherein the input signal comprises an input voltage, and wherein, during the constant voltage charging mode, the first control circuit is configured to control a charging voltage across the rechargeable battery to be substantially equal a predefined voltage.

13. The circuit of claim 10, the first control circuit operates in the constant current charging mode when a voltage across the rechargeable battery is below a first threshold, and in the constant voltage charging mode when the voltage across the rechargeable battery is above the first threshold.

14. The circuit of claim 5, wherein the second control circuit is configured to turn off the electronic switch when the rechargeable battery is fully charged.

15. The circuit of claim 1, wherein, in a discharging mode, the second control circuit measures a discharging current flowing through the rechargeable battery and limit the discharging current to a predefined maximum current by controlling the reference signal.

16. The circuit of claim 1, wherein the second power converter circuit comprises a buck converter or a boost converter.

17. The circuit of claim 1, wherein the second power converter circuit is configured to supply the first power to a DC voltage grid.

18. The circuit of claim 1, wherein the first control circuit comprises a PWM controller.

19. The circuit of claim 1, wherein the second power converter circuit comprises a bidirectional converter.

20. The circuit of claim 1, wherein the second power converter circuit is configured to supply the first power to an AC voltage grid, and wherein the first control circuit is configured to receive a synchronization signal that is in phase with the AC voltage grid.

21. A method comprising:
supplying a first output power at an output of a first power converter circuit;
supplying a second output power at an output of a second power converter, the second power converter having an input coupled to the output of the first power converter circuit to receive an input signal; and
controlling, during a charging mode, a charging of a rechargeable battery coupled to the output of the first power converter circuit by
detecting a charge state of the rechargeable battery, and
providing a reference signal based on the detected charge state to the second power converter, wherein the reference signal represents a desired signal level of the input signal, and wherein the second power converter limits the input signal based on the reference signal while the second output power is positive.

22. The method of claim 21, wherein the input signal comprises an input current or an input voltage.

23. The method of claim 22 further comprising:
measuring a voltage at the rechargeable battery, and
controlling the input current when a rechargeable battery voltage is below a voltage threshold.

24. The method of claim 23, wherein the rechargeable battery voltage is controlled when the rechargeable battery voltage is above the voltage threshold.

25. A circuit comprising:
a first power converter circuit comprising an output;
a second power converter circuit comprising an input, an output, and a first control circuit, wherein
the input of the second power converter circuit is coupled to the output of the first power converter circuit and is configured to receive an input signal,
the output of the second power converter circuit is configured to be coupled to a load, and
the second power converter circuit is configured to deliver at the output of the second power converter circuit a first power;
a rechargeable battery node coupled to the output of the first power converter circuit, the rechargeable battery node configured to be coupled to a rechargeable battery; and
a second control circuit coupled to the first control circuit, the second control circuit configured to control charging the rechargeable battery during a charging mode by detecting a charge state of the rechargeable battery, and
providing a reference signal based on the detected charge state to the first control circuit, wherein the reference signal represents a desired signal level of the input signal, and wherein the first control circuit is configured to limit the input signal based on the reference signal while the first power is positive.

26. The circuit of claim 25, wherein the second control circuit is configured to measure a voltage at the rechargeable battery node and to control an input current when a rechargeable battery voltage is below a voltage threshold and wherein the second control circuit is configured to control the rechargeable battery voltage when the rechargeable battery voltage is above the voltage threshold.

27. The circuit of claim 25, further comprising the rechargeable battery.

* * * * *